(12) United States Patent
Niidome et al.

(10) Patent No.: US 6,389,809 B1
(45) Date of Patent: May 21, 2002

(54) VOLUME CONTROL VALVE OF VARIABLE DISPLACEMENT HYDRAULIC ROTATING MACHINE

(75) Inventors: Takashi Niidome; Hitoshi Kagiwada, both of Tsuchiura; Takeshi Kobayashi, Chiyoda-machi, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/762,325

(22) PCT Filed: May 23, 2000

(86) PCT No.: PCT/JP00/03287

§ 371 Date: Feb. 6, 2001

§ 102(e) Date: Feb. 6, 2001

(87) PCT Pub. No.: WO00/77403

PCT Pub. Date: Dec. 21, 2000

(30) Foreign Application Priority Data

Jun. 10, 1999 (JP) .......................................... 11-164484
Mar. 2, 2000 (JP) ........................................ 2000-57625

(51) Int. Cl.$^7$ ................................................. F15B 7/00
(52) U.S. Cl. ......................................... 60/443; 60/445
(58) Field of Search ............... 60/443, 445; 137/625.66

(56) References Cited

U.S. PATENT DOCUMENTS 2,536,965 A * 1/1951 Taylor .................. 137/625.66
2,964,059 A * 12/1960 Geyer .................... 137/625.62
3,015,317 A * 1/1962 Buchanan et al. ..... 137/625.62

FOREIGN PATENT DOCUMENTS

| JP | 57-43002 | 3/1982 |
| JP | 62-45401 | 3/1987 |
| JP | 1-116301 | 5/1989 |
| JP | 7-2127 | 1/1995 |
| JP | 10-252703 | 9/1998 |

* cited by examiner

Primary Examiner—Gerald A. Michalsky
(74) Attorney, Agent, or Firm—Mattingly, Stanger & Malur, P.C.

(57) ABSTRACT

A volume control valve for controlling the volume of a variable displacement type hydraulic rotary machine includes a valve housing provided with a bore in which a spool slides axially to selectively establish and block communication of a pressure oil feed/discharge port with a high pressure port and a tank port. A first pressure receiving portion is formed in the spool to receive a load pressure as a pilot pressure introduced from a pilot port for displacing the spool axially within the bore. A bottomed axial bore is formed in the spool which has a slidable piston therein defining an oil chamber between the piston end and the bottom of the bore to receive a hydraulic reaction force induced within the oil chamber. A second pressure receiving portion is formed by the bottom of the bore to receive an internal pressure of the oil chamber, thereby changing a total pressure receiving area of the spool in conjunction with the first pressure receiving portion. An oil passage is formed in the spool at a position corresponding to the oil chamber.

19 Claims, 17 Drawing Sheets

VOLUME CONTROL VALVE OF VARIABLE DISPLACEMENT HYDRAULIC ROTATING MACHINE

TECHNICAL FIELD

The present invention relates to a volume control valve for a variable displacement type hydraulic rotary machine suitable for use, for example, as a variable displacement hydraulic pump or motor in a construction machine such as a hydraulic excavator.

BACKGROUND ART

Generally, a variable displacement type hydraulic rotary machine is used as a hydraulic pump serving as an oil pressure source or as a hydraulic motor for traveling or rotation, in a construction machine or the like. For example, in case of using a variable displacement type hydraulic rotary machine as a hydraulic motor for traveling, the motor volume is switched between a large volume and a small volume by means of an actuator of variable volume, whereby the hydraulic motor is rotated at a low speed with a high torque when the motor volume is large, while the motor is rotated at a high speed with a low torque when the motor volume is small.

As a volume control unit for a hydraulic motor there is known a self-pressure control type volume control unit which controls the motor volume in accordance with a load pressure acting on a hydraulic motor from the exterior (see, for example, Japanese Patent Laid Open No. SHO57-43002). In the self-pressure control type volume control unit, a load pressure of a hydraulic motor is fed as a pilot pressure to a volume control valve and the position of the volume control valve is switched selectively between a large volume position and a small volume position in accordance with the pilot pressure, thereby selectively controlling pressure oil to be fed to an actuator of variable volume.

In this conventional self-pressure control type volume control unit, the volume control valve is composed of a main change-over valve for supplying pressure oil selectively to an actuator of variable volume and a pilot valve which detects a load pressure of a hydraulic motor and which controls the main change-over valve selectively in accordance with the load pressure.

The main change-over valve is switched between a large volume position and a small volume position in accordance with a pilot pressure (load pressure) which is fed through the pilot valve, allowing a pilot pressure receiving area to be changed between the large and small volume positions to prevent the occurrence of hunching at the time of switching from one to another volume.

More particularly, when the hydraulic motor volume is switched from a small to a large volume, the load pressure tends to decrease, so there is a fear that the motor volume may be switched again from the large to the small volume as the load pressure decreases. The load pressure increases upon switching of the motor volume to the small volume, so that the motor volume is again switched from the small to the large volume. Thus, what is called hunching phenomenon occurs.

According to the foregoing conventional construction, for preventing the occurrence of such a hunching phenomenon, the pilot pressure receiving area of the main change-over valve is varied between the large volume position and the small volume position to impart, for example, such a hysteresis characteristic as shown in FIG. 5 which will be described later to a set value of the pilot pressure (load pressure) for changing the motor volume.

In the above conventional volume control unit, since the volume control valve used in the hydraulic motor volume control unit is composed of the main change-over valve which supplies pressure oil selectively to the actuator of variable volume for the hydraulic motor and the pilot valve which selectively controls the main change-over valve in accordance with a load pressure of the hydraulic motor, it is necessary to provide the pilot valve separately from a spool of the main change-over valve, thus resulting in that the whole of the control unit becomes complicated, causing an obstacle to the attainment of size reduction.

As another conventional example, for example in Japanese Utility Model Laid Open No. SHO62-45401 (Publication No. HEI6-28345) there is disclosed a construction wherein a spool of a volume control valve constituted by a hydraulic pilot valve is formed in a stepped shape and a load pressure of a hydraulic motor is exerted as a pilot pressure on a large-diameter side of the spool, whereby the volume control valve is switched from a small volume position to a large volume position in accordance with the load pressure. In this volume control valve, a pressure oil feed/discharge port formed on a high pressure side is blocked by a land portion of the spool until the load pressure decreases in a predetermined certain range, thereby imparting a hysteresis characteristic to a set value of the pilot pressure.

However, this conventional construction is merely such that when the load pressure begins to decrease at a large motor volume, the pressure oil feed/discharge port formed on the high pressure side is blocked by a land portion of the spool to suppress the decrease of the motor volume. If the pressure oil leaks even a slight amount from the spool land portion, the motor volume switches to the small volume side and thus it is difficult to control the motor volume stably.

As a further conventional example, for example in Japanese Patent Laid Open No. HEI1-116301 there is disclosed a construction wherein, for switching the motor volume between large and small volumes using an external command pressure, a stepped portion for receiving an external command pressure is formed in a spool of a volume control valve, and on this stepped portion side an external command pressure receiving area is varied according to a slide position (drive position) of the spool.

According to this conventional construction, however, a sleeve is fitted on the stepped portion side of the spool and the external command pressure receiving area is varied according to a relative position between the stepped portion of the spool and the sleeve, thus requiring the provision of the sleeve separately from the spool. As a result, the number of components used increases and the structure of the volume control valve becomes complicated; besides, it is difficult to reduce the entire size.

DISCLOSURE OF THE INVENTION

The present invention has been accomplished in view of the problems of the conventional techniques mentioned above and it is an object of the invention to provide a volume control valve for a variable displacement type hydraulic rotary machine capable of reducing the number of components used, thereby improving the assembling work efficiency, capable of forming the whole in a compact shape and thereby attaining the reduction of size, and further capable of stabilizing and automating volume control.

For achieving the above-mentioned object and for controlling the volume of a variable displacement type hydraulic rotary machine with use an actuator of variable volume, the present invention is applied to a volume control valve for the variable displacement type hydraulic rotary machine, the volume control valve being constructed such that a load pressure of the variable displacement type hydraulic rotary machine is received as a pilot pressure to switch pressure oil to be fed to the actuator from one pressure level to another.

In one aspect of the present invention there is provided a volume control valve for a variable displacement type hydraulic rotary machine, comprising a valve housing having a spool sliding bore, with a high pressure port, a tank port, a pilot port, and a pressure oil feed/discharge port for an actuator of variable volume being formed in the spool sliding bore in axially spaced positions; a spool inserted into the spool sliding bore of the valve housing and adapted to slide axially through the spool sliding bore to selectively establish and block communication of the pressure oil feed/discharge port with the high pressure port and the tank port; a first pressure receiving portion formed in the spool to receive a pilot pressure introduced from the pilot port, thereby displacing the spool axially within the spool sliding bore; a bottomed axial bore formed in the spool, the axial bore extending in the axial direction of the spool and being open to an end face of the spool; a piston inserted slidably into the axial bore so as to close the open end of the axial bore, the piston defining an oil chamber between it and the bottom of the axial bore and receiving a hydraulic reaction force induced within the oil chamber; a second pressure receiving portion formed by the bottom of the axial bore and adapted to receive an internal pressure of the oil chamber, thereby changing a total pressure receiving area of the spool in conjunction with the first pressure receiving portion; and an oil passage formed in the spool at a position corresponding to the oil chamber, the oil passage causing the oil chamber to come into communication selectively with ports different in pressure out of the said ports when the spool is put in a sliding displacement within the spool sliding bore.

According to this construction, the oil passage causes the oil chamber to communicate with ports different in pressure, e.g., pilot port and tank port, selectively in accordance with a sliding displacement of the spool. Upon communication of the oil chamber with the pilot port, the spool receives at the second pressure receiving portion a pilot pressure introduced into the oil chamber, while upon communication of the oil chamber with the tank port, the pilot pressure receiving state is cancelled. Thus, the total pressure receiving area of the spool at the first and second pressure receiving portions varies depending on with which port the oil chamber is in communication through the oil passage. By utilizing this change in the pressure receiving area it is possible to impart a hysteresis characteristic to a switching pressure (pilot pressure) of the volume control valve.

In another aspect of the present invention, a biasing means is disposed between the valve housing and the spool to urge the spool constantly in a direction opposite to the pilot pressure receiving direction of the first pressure receiving portion. According to this construction, when the load pressure of the hydraulic rotary machine is low, the spool is put in a sliding displacement in one direction by the biasing means, while upon increase of the pilot pressure the spool is slidingly displaced in the opposite direction against the biasing force of the biasing means by the first pressure receiving portion. During this period, the oil chamber is selectively brought into and out of communication with ports different in pressure, thereby causing the pilot pressure receiving area of the spool at the first and second pressure receiving portions to be varied, whereby it is possible to impart a hysteresis characteristic to the switching pressure of the volume control valve.

In a further aspect of the present invention there is provided a volume control valve for a variable displacement type hydraulic rotary machine, comprising a valve housing having a spool sliding bore, with a high pressure port, a tank port, a pilot port, an external command pressure port, and a pressure oil feed/discharge port for an actuator of variable volume being formed in the spool sliding bore in axially spaced positions; a spool inserted into the spool sliding bore of the valve housing and adapted to slide axially through the spool sliding bore to selectively establish and block communication of the pressure oil feed/discharge port with the high pressure port and the tank port; a command pressure receiving portion formed in the spool to receive an external command pressure introduced from the external command pressure port, thereby displacing the spool in the axial direction; a first pressure receiving portion formed in the spool so as to be axially opposed to the command pressure receiving portion and adapted to receive a pilot pressure introduced from the pilot port, thereby displacing the spool in a direction reverse to the command pressure receiving portion; a bottomed axial bore formed in the spool, the axial bore extending in the axial direction of the spool and being open to an end face of the spool; a piston inserted slidably into the axial bore so as to close the open end of the axial bore, the piston defining an oil chamber between it and the bottom of the axial bore and receiving a hydraulic reaction force induced within the oil chamber; a second pressure receiving portion formed by the bottom of the axial bore to receive an internal pressure of the oil chamber, thereby changing a total pressure receiving area of the spool in conjunction with the first pressure receiving portion; and an oil passage formed in the spool at a position corresponding to the oil chamber, the oil passage causing the oil chamber to come into communication selectively with ports different in pressure out of the said ports when the spool is put in a sliding displacement within the spool sliding bore.

According to this construction, the volume control valve can be selectively controlled using the external command pressure. For example, in a lowered state of the external command pressure down to the tank pressure level, it is possible to maintain the spool at a slide position thereof in one direction irrespective of the pilot pressure introduced from the pilot port and fix the volume control valve at a large volume position for example. When the external command pressure is increased to displace the spool in the opposite direction, the spool becomes slidable in one direction or in the opposite direction in accordance with a load pressure (pilot pressure) of the hydraulic rotary machine. In this state, when pushed in one direction upon receipt of a pilot pressure, the spool receives an external command pressure in the opposite direction. Thus, the volume control valve can make a selective volume control by utilizing a difference between the external command pressure and the pilot pressure, i.e., difference between pressure receiving areas, and with a hysteresis characteristic for the pilot pressure.

According to the present invention, the command pressure receiving portion is formed by the end face at one end of the spool. Consequently, the external command pressure can be received by the whole of one end face of the spool and, even if the external command pressure is a relatively low pressure, the command pressure receiving portion can receive the external command pressure at a large pressure receiving area.

In a still further aspect of the present invention, a biasing means is disposed between the valve housing and the spool to urge the spool constantly in a direction opposite to the external command pressure receiving direction of the external command pressure receiving portion.

With this construction, for example when the external command pressure has been decreased down to the tank pressure level, by urging the spool in one direction with use of the biasing means it is possible to maintain the spool at a slide position thereof in one direction irrespective the pilot pressure introduced from the pilot port and fix the volume control valve at a large volume position for example. When the external command pressure is set large, the spool can be pushed in the opposite direction against the biasing force of the biasing means and in this state it becomes possible to let the spool slide in accordance with a load pressure of the hydraulic rotary machine, whereby it is made possible to effect a selective volume control with a hysteresis characteristic imparted to the pilot pressure.

In a still further aspect of the present invention, an external command pressure chamber communicating with the external command pressure port is defined between the command pressure receiving portion and the valve housing, and a throttle for generating a damper action in the external command pressure chamber is provided in a command pressure conduit which connects the external command pressure port to an external command pressure supply means.

According to this construction, even in the event of an instantaneous variation of the load pressure, for example at the time of start-up of the hydraulic rotary machine, it is possible to let the external command pressure chamber act as a damper chamber. Thus, not only it is possible to suppress an instantaneous motion of the spool and thereby suppress the occurrence of a hunching phenomenon but also it is possible to stabilize the selective volume control.

In a still further aspect of the present invention, an external command pressure chamber communicating with the external command pressure port is defined between the command pressure receiving portion and the housing, a throttle for generating a damper action in the external command pressure chamber is provided in a command pressure conduit which connects the external command pressure port to an external command pressure supply means, and a seal member for sealing the external command pressure chamber in a liquid-tight manner with respect to the pilot port is disposed between the valve housing and the spool.

Also in this case the external command pressure chamber can be allowed to act as a damper chamber by the throttle provided in the command pressure conduit, whereby not only an instantaneous motion of the spool can be suppressed to suppress the occurrence of a hunching phenomenon but also the selective volume control can be stabilized. Besides, with the seal member, it is possible to prevent a high pressure from leaking from the pilot port to the external command pressure chamber side and hence "confined pressure" is prevented from being developed by the throttle within the external command pressure chamber.

In a still further aspect of the present invention, a pipe joint which constitutes a part of the command pressure conduit is provided in the external command pressure port of the valve housing, and a throttle is provided in the pipe joint. According to this construction, a throttle for allowing the external command pressure chamber to function as a damper chamber can be incorporated within the pipe joint and thus it is no longer required to separately provide a throttle halfway of a piping which constitutes the command pressure conduit.

In a further aspect of the present invention, the oil passage selectively establishes and blocks communication of the oil chamber with the pilot port and the tank port in accordance with a slide position of the spool, and the spool receives the pilot pressure at a large pressure receiving area on both first and second pressure receiving portion sides when the oil chamber communicates with the pilot port through the oil passage, while when the oil chamber communicates with the tank port through the oil passage, the spool receives the pilot pressure at a small pressure receiving area on the first pressure receiving portion side.

According to this construction, while the oil chamber is in communication with the pilot port through the oil passage, the pilot pressure is introduced into the oil chamber, so that, by the second pressure receiving portion, the pilot pressure receiving area of the spool can be increased by an amount corresponding to the pressure receiving area of the oil chamber. Further, when the oil chamber is in communication with the tank port through the oil passage, the internal pressure of the oil chamber drops to the tank pressure level, so that the spool receives the pilot pressure at only the first pressure receiving portion, whereby the pressure receiving area of the spool can be diminished.

In a still further aspect of the present invention, the second pressure receiving portion has a pressure receiving area smaller than that of the first pressure receiving portion, and when the oil chamber comes into communication with the pilot port, the second pressure receiving portion receives the pilot pressure in a direction reverse to the first pressure receiving portion.

According to this construction, the pilot pressure is conducted into the oil chamber while the oil chamber is in communication with the pilot port, whereby the second pressure receiving portion receives the pilot pressure in a direction reverse to the first pressure receiving portion and thus the pilot pressure receiving area of the first pressure receiving portion can be offset and reduced by the pilot pressure receiving area of the second pressure receiving portion. When the oil chamber communicates with the tank port of a low pressure, the internal pressure of the oil chamber drops to a low pressure level and the pressure acting on the spool in a direction reverse to the first pressure receiving portion becomes low, so that the spool can receive the pilot pressure at a large pressure receiving area on the first pressure receiving portion side and it is possible to relatively increase the pilot pressure receiving area.

In a still further aspect of the present invention, the first pressure receiving portion is formed in the spool as a bottomed bore extending in the axial direction of the spool, the bottomed hole having a diameter larger than the diameter of the axial bore and being open to an end face of the spool on the side opposite to the axial bore, and a piston member larger in diameter than the piston is inserted slidably into the bottomed bore to define a pilot pressure receiving chamber which is constantly in communication with the pilot port.

According to this construction, a pilot pressure receiving chamber always communicating with the pilot port can be defined between the bottom portion of the bottomed bore and the piston member and the first pressure receiving portion formed as the bottomed bore within the spool can always receive the pilot pressure through the pressure receiving chamber.

In a still further aspect of the present invention, the oil passage selectively establishes and blocks communication of the oil chamber with the pilot port and the external command pressure port in accordance with a slide position of the spool, and the second pressure receiving portion receives the pilot pressure or the external command pressure in a direction reverse to the first pressure receiving portion.

According to this construction, while the oil chamber is in communication with the pilot port, the pilot pressure is conducted into the oil chamber, whereby the second pressure receiving portion receives the pilot pressure in a direction reverse to the first pressure receiving portion and thus the pilot pressure receiving area of the first pressure receiving portion can be offset and reduced by the pressure receiving area of the second pressure receiving portion. When the oil chamber communicates with the external command pressure port, the internal pressure of the oil chamber can be lowered to the level of the external command pressure, so that the pressure acting on the spool in a direction reverse to the first pressure receiving portion becomes low. Consequently, the spool can receive the pilot pressure at a large pressure receiving area on the first pressure receiving portion side and thus the pilot pressure receiving area can be increased relatively.

In a still further aspect of the present invention, the spool is constituted by a stepped stool whose one end side is larger in diameter than the other portion thereof, and the first pressure receiving portion is formed by a stepped outer periphery portion of the spool which is positioned on the larger-diameter side of the spool.

According to this construction, at the outer periphery on one end side of the spool there can be formed the first pressure receiving portion as an annular portion in the position of the stepped portion having a large diameter, and the spool can be put in a sliding displacement by the pilot pressure acting on the first pressure receiving portion. In this case, since it is not necessary to form a bottomed bore separate from the axial bore in the spool to define a pilot pressure receiving chamber, it is possible to shorten the overall length of the spool.

In a still further aspect of the present invention, the oil passage is formed so that when the oil chamber is communicated with the pilot port, the oil chamber is brought out of communication with the other ports almost simultaneously, while when the oil chamber is communicated with the other ports, the oil chamber is brought out of communication with the pilot port almost simultaneously.

In this way the spool can establish and block communication between the oil chamber and the ports through the oil passage with zero lap. For example, it is possible to prevent the oil chamber from communicating with the pilot port and the tank port or the external command pressure port at a time which would result in the internal pressure of the oil chamber becoming unstable.

In a still further aspect of the present invention, the spool has a plurality of lands for blocking communication between ports different in pressure, and the oil passage has a throttle passage at a position where the oil chamber is brought into and out of communication with a port lower in pressure than the pilot port out of the plural ports.

According to this construction, even when the oil chamber comes into communication with the tank port for example in accordance with a sliding displacement of the spool after the pilot pressure has been introduced into the oil chamber from the pilot port to raise the internal pressure of the oil chamber, the raised pressure in the oil chamber can be prevented by the throttle passage from flowing out as a jet to the tank port side, thus making it possible to prevent the occurrence of such an inconvenience as the generation of an abnormal pressure on the tank port side which is low in pressure.

BEST MODE FOR CARRYING OUT THE INVENTION

Figure 1:
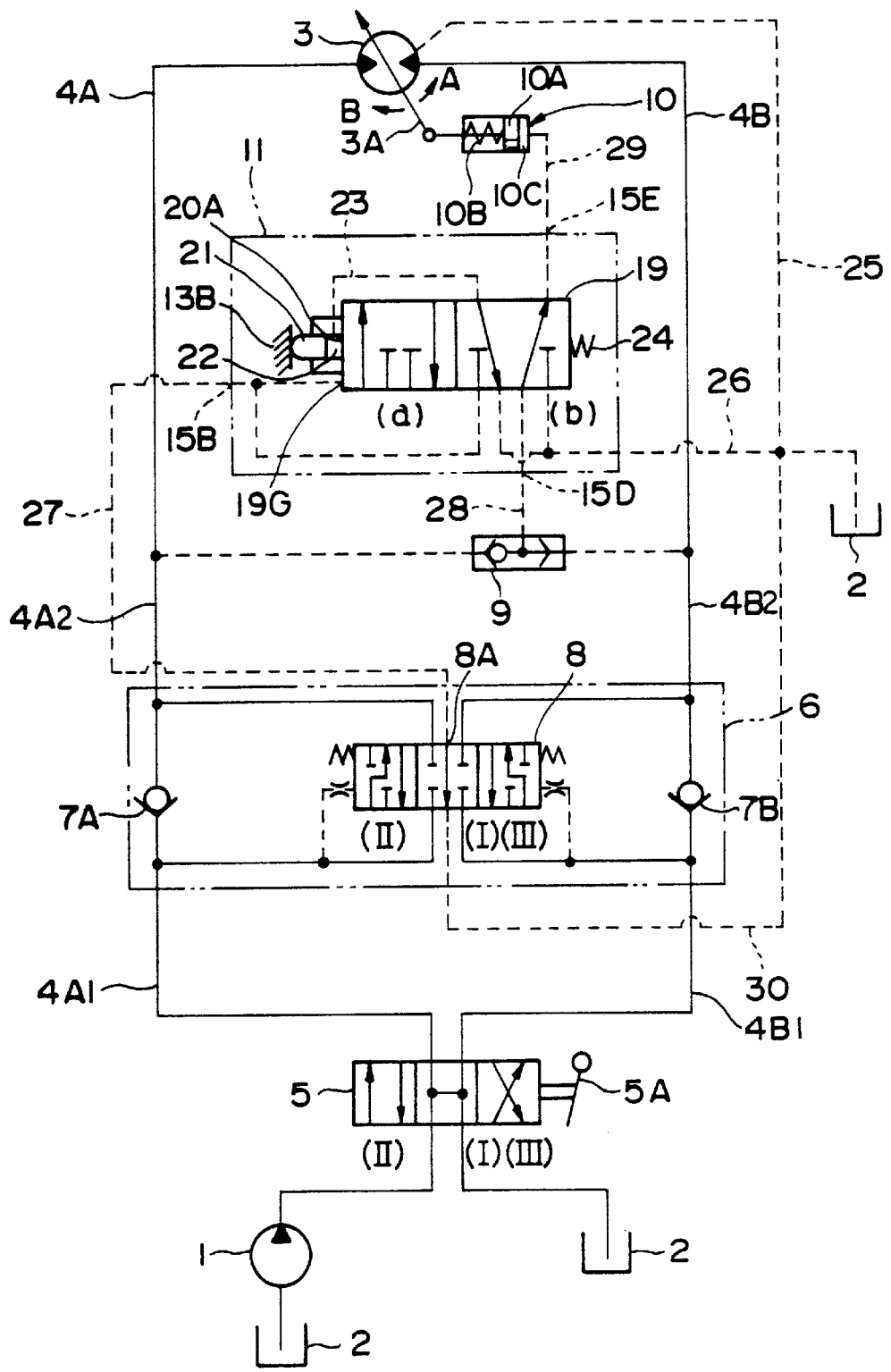
FIG. 1 is a hydraulic circuit diagram for traveling of a hydraulic excavator to which a volume control valve according to a first embodiment of the present invention is applied.

Volume control valves for a variable displacement type hydraulic rotary machine embodying the present invention will be described in detail hereinunder with reference to the accompanying drawings while citing as an example the case where the volume control valves are applied to a traveling hydraulic motor such as a hydraulic excavator.

FIGS. 1 to 5 illustrate the first embodiment of the present invention, in which the reference numeral 1 denotes a hydraulic pump which constitutes an oil pressure source together with a tank 2. The hydraulic pump 1 is rotationally driven by means of a prime mover (not shown) of the hydraulic excavator and supplies operating oil sucked from the tank 2 as a high pressure oil to a hydraulic motor 3, etc. which will be described later.

The numeral 3 denotes a hydraulic motor, which is constituted, for example, by a swash plate or bent axis type variable displacement hydraulic rotary machine. The hydraulic motor 3 has a volume varying section 3A formed by a swash plate or a valve plate. When the volume varying section 3A is tilted in the direction of arrow A, i.e., in a tilt angle increasing direction, using a servo-actuator 10 which will be described later, the volume of the hydraulic motor 3 is increased to a large volume side, while when the volume varying section 3A is tilted in the direction of arrow B, i.e., in a tilt angle decreasing direction, the motor volume is decreased to a small volume side.

Numerals 4A and 4B denote a pair of main conduits which connect the hydraulic motor 3 to the hydraulic pump 1 and the tank 2. The main conduits 4A and 4B supply pressure oil from the hydraulic pump 1 to the hydraulic motor 3 through, for example, a directional control valve 5 to be described after. With the pressure oil, the hydraulic motor 3 rotates forward or reverse, causing the hydraulic excavator (vehicle) to move forward or reverse. The main conduits 4A and 4B have oil pressure source-side conduit portions 4A1 and 4B1 between a counterbalance valve 6 to be described later and the directional control valve 5 and also have actuator-side conduit portions 4A2 and 4B2 between the counterbalance valve 6 and the hydraulic motor 3.

Numeral 5 denotes a directional control valve for traveling which is disposed in the main conduits 4A and 4B. For example, as shown in FIG. 1, the directional control valve 5 is constituted as a 4-port 3-position directional control valve. When the operator of the hydraulic excavator selectively operates an operating lever 5A, the directional control valve 5 is switched from a neutral position (I) to a drive position (II) or (III).

At the position (II) the directional control valve 5 supplies pressure oil from the hydraulic pump 1 to the hydraulic motor 3 through the main conduit 4A, causing the hydraulic motor 3 to rotate in the forward direction for example. At the same time, the directional control valve 5 allows return oil from the hydraulic motor 3 to be discharged to the tank 2 through the main conduit 4B. When the directional control valve 5 is switched to the position (III), the pressure oil supply reverse direction and the hydraulic motor 3 is rotated in the reverse direction.

Numeral 6 denotes a counterbalance valve which constitutes a brake valve attached to the hydraulic motor 3. The counterbalance valve 6 is made up of a pair of check valves 7A and 7B disposed between the oil pressure source-side conduit portions 4A1, 4B1 and the actuator-side conduit portions 4A2, 4B2, and a pressure control valve 8 disposed between the conduit portions 4A1, 4B1 and the conduit portions 4A2, 4B2 and connected in parallel with the check valves 7A and 7B.

The pressure control valve 8 in the counterbalance valve 6 switches from the neutral position (I) to the drive position (II) or (III) substantially in interlock with the directional control valve 5 to compensate the supply of pressure oil from the hydraulic pump 1 to the hydraulic motor 3. During inertial rotation of the hydraulic motor 3 the pressure control valve 8 returns to the neutral position (I), whereby a braking pressure is generated between the hydraulic motor 3 and the counterbalance valve 6 and within the actuator-side conduit portion 4A2 or 4B2.

The pressure control valve 8 in the counterbalance valve 6 is constituted by a 6-port 3-position hydraulic pilot type directional control valve and has a center by-pass port 8A serving as a high pressure outlet port. When the pressure control valve 8 switches from the neutral position (I) to the position (II), the center by-pass port 8A is connected to the high pressure-side conduit portion 4A1 out of the oil pressure source-side conduit portions 4A1 and 4B1, while upon switching to the position (III) the center by-pass port 8A is connected to the conduit portion 4B1.

In this way the center by-pass port 8A of the pressure control valve 8 conducts a motor drive pressure as a load pressure of the hydraulic motor 3 into a pilot conduit 27 to be described later and causes a volume control valve 11 which will be described later to make a selective control in accordance with a pilot pressure provided from the pilot conduit 27. When the pressure control valve 8 returns to the neutral position (I), the center by-pass port 8A is connected to a tank conduit 30 which will be described later, so that the pilot pressure in the pilot conduit 27 drops to the tank pressure level automatically.

Numeral 9 denotes a shuttle valve as a high pressure selection valve disposed between the hydraulic motor 3 and the counterbalance valve 6 and also between the conduit portions 4A2 and 4B2 of the main conduits 4A and 4B. The shuttle valve 9 selects pressure oil in either the conduit portion 4A2 or 4B2 of the main conduit 4A or 4B, whichever is at a higher level, and supplies the selected pressure oil to the servo-actuator 10 through a high pressure conduit 28 and the volume control valve 11.

The servo-actuator 10, which serves as an actuator of variable volume attached to the hydraulic motor 3, has a tilting piston 10A for driving the volume varying section 3A of the hydraulic motor 3 and normally urges the volume varying section 3A to a large tilt (large volume) side in the direction of arrow A with use of a spring 10B. When a high pressure oil is fed into an oil chamber 10C, the volume varying section 3A is shifted in the direction of arrow B against the spring 10B by means of the tilting piston 10A in the servo-actuator 10 to switch the motor volume from a large to a small volume.

Figure 2:
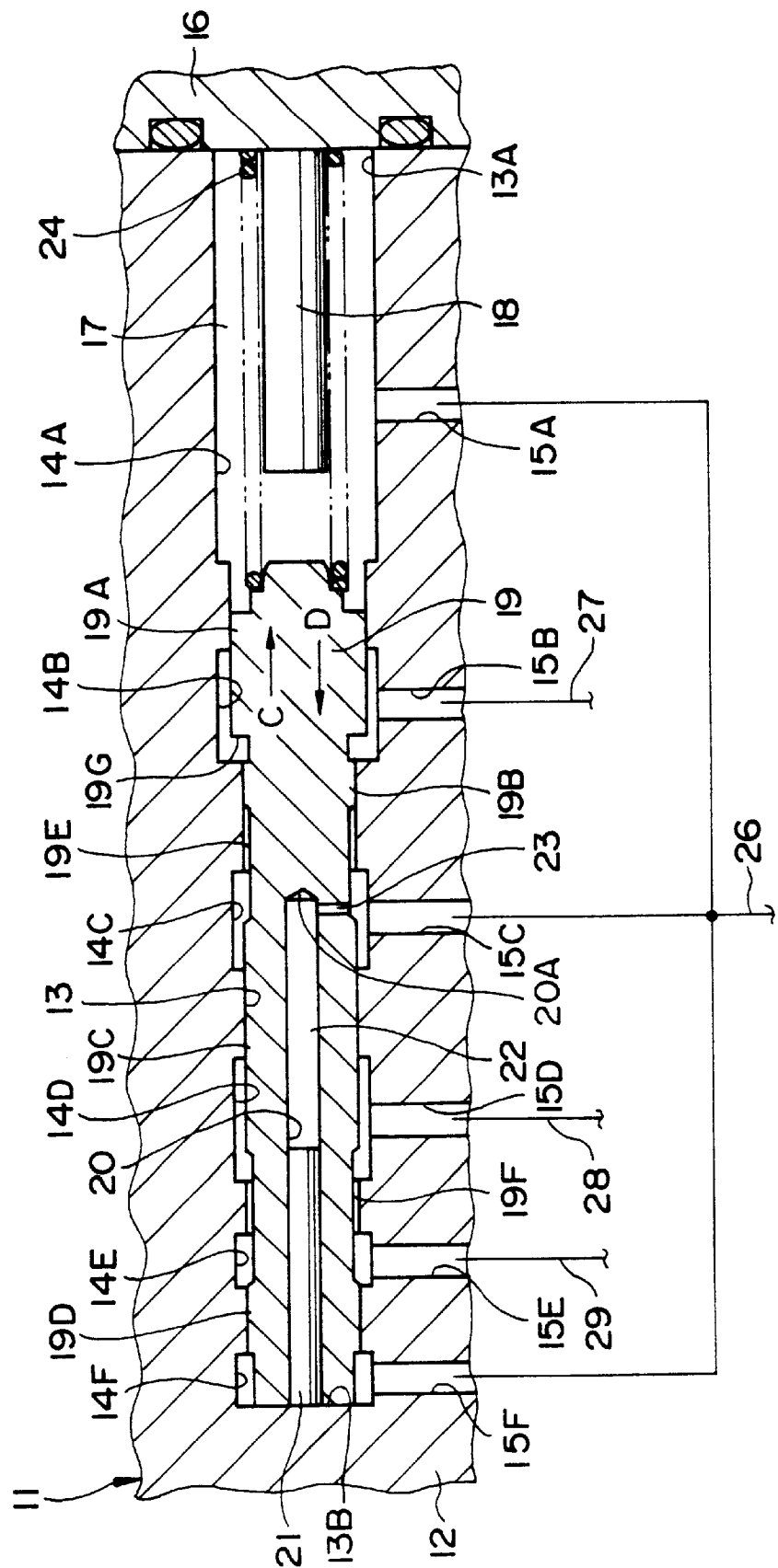
FIG. 2 is a longitudinal sectional view showing a state in which the volume control valve illustrated in FIG. 1 is in a small volume position.

The volume control valve 11 is attached to the hydraulic motor 3 together with the servo-actuator 10 and, as shown in FIG. 2, the volume control valve 11 is composed of a valve housing 12, a spool 19 disposed slidably within the valve housing 12 and a piston 21 as will be described later. As shown in FIG. 1, the volume control valve 11 is constituted by a 6-port 2-position hydraulic pilot type change-over valve and is selectively controlled between a large volume position (a) and a small volume position (b) with a pilot pressure P fed from the pilot conduit 27.

When the volume control valve 11 is in the small volume position (b), it supplies pressure oil from a high pressure conduit 28 to the oil chamber 10C in the servo-actuator 10 through a feed/discharge conduit 29 which will be described later. As a result, the tilting piston 10A causes the volume varying section 3A to tilt in the direction of arrow B in which the tilt angle becomes smaller. Upon switching to the large volume position (a) the volume control valve 11 connects the feed/discharge conduit 29 to a tank conduit 26, allowing the pressure oil present in the oil chamber 10C to be discharged toward the tank 2. As a result, the servo-actuator 10 causes the volume varying section 3A to be tilted by the spring 10B in the direction of arrow A in which the tilt angle becomes large.

In the valve housing 12 of the volume control valve 11 is formed a stepped, spool sliding bore 13 which has an open end 13A on one end thereof and a closed end 13B on the opposite end. The spool sliding bore 13 is circumferentially formed with annular oil grooves 14A, 14B, 14C, 14D, 14E, and 14F in axially spaced positions.

Likewise, in the valve housing 12 are formed tank ports 15A, 15C, 15F, a pilot port 15B, a high pressure port 15D, and a pressure oil feed/discharge port 15E in an axially spaced relation to one another. The ports 15A to 15F communicate with the interior of the spool sliding bore 13 through the oil grooves 14A to 14F.

Figure 3:
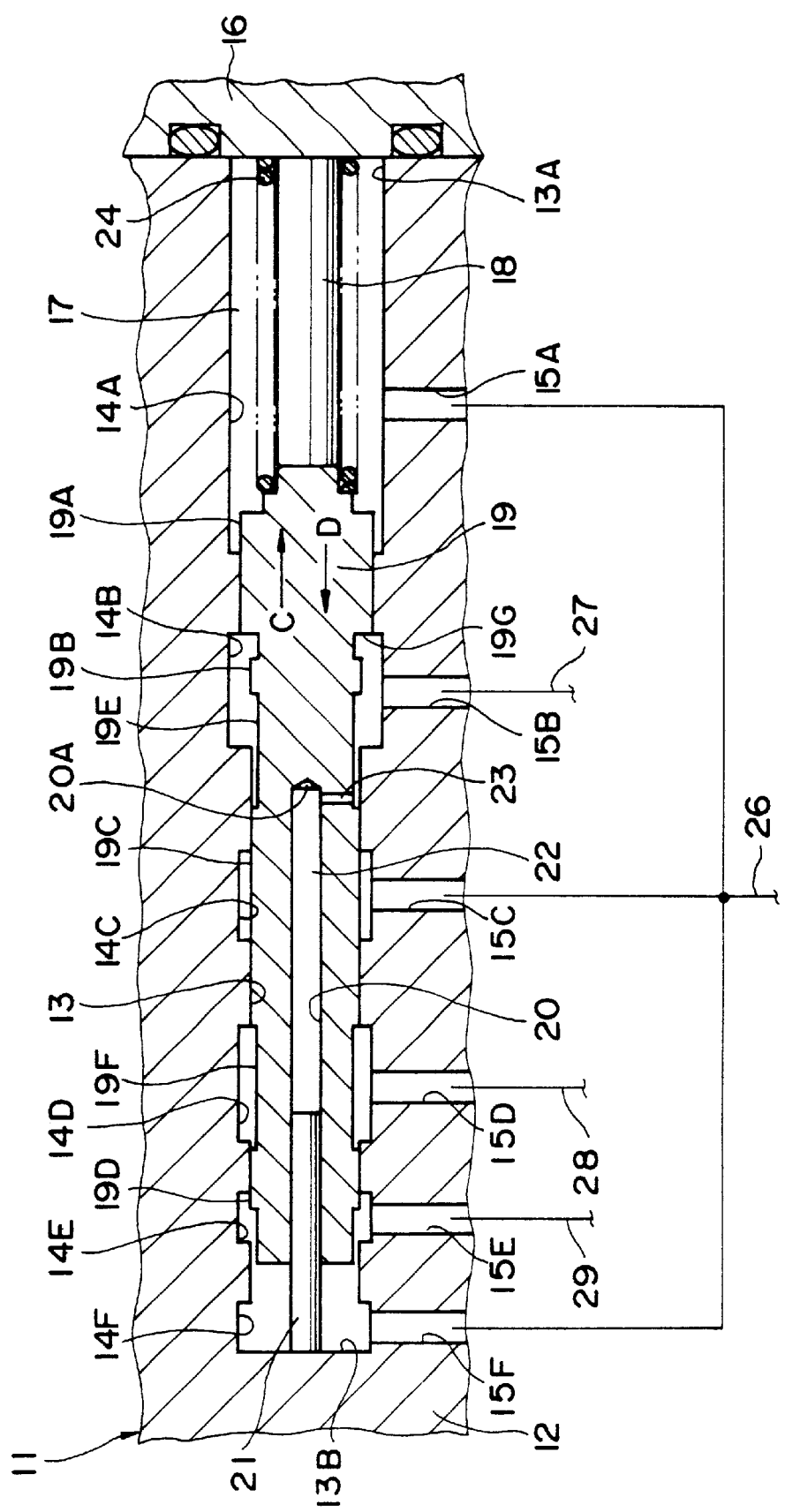
FIG. 3 is a longitudinal sectional view of the volume control valve, showing a state in which a spool has slid up to a stroke end thereof and switched to a large volume position.

Numeral 16 denotes a lid member which closes the open end 13A of the spool sliding bore 13 and which constitutes a part of the valve housing 12. Between the lid member 16 and the end face at one end of the spool 19 to be described later there is formed a spring chamber 17 which is positioned within the oil groove 14A. On an inner surface of the lid member 16 is mounted a rod-like stopper 18 which projects toward the interior of the spring chamber 17. The stopper 18 delimits the stroke end of the spool 19, as shown in FIG. 3.

Figure 4:
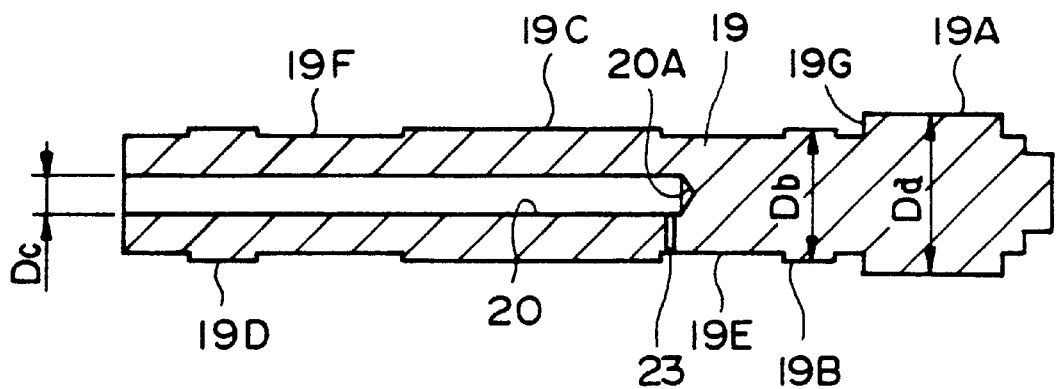
FIG. 4 is a longitudinal sectional view showing the spool illustrated in FIG. 2.

The spool 19 is inserted into the spool sliding bore 13 of the valve housing 12. As shown in FIGS. 2 and 4, the spool 19 is circumferentially formed with lands 19A, 19B, 19C, and 19D in an axially spaced relation to one another. Between the lands 19B and 19C is formed an annular oil groove 19E to establish and block communication between the oil grooves 14B and 14C. Further, between the lands 19C and 19D of the spool 19 is formed another oil groove 19F to establish and block communication between the oil grooves 14D and 14E. With the annular groove 19F and the land 19D, the pressure oil feed/discharge port 15E is selectively brought into and out of communication with the high pressure port 15D and the tank port 15F.

The spool 19 is formed as a stepped spool having a largest diameter on the land 19A side which is positioned at one end of the spool. A stepped portion (end face side) of the land 19A opposed to the land 19B serves as a first pressure receiving portion 19G which receives pilot pressure P from the pilot conduit 27. The lands 19A and 19B are formed to have outside diameters Da and Db, respectively. The pressure receiving portion 19G has a pressure receiving area S1 based on the following Expression 1:

$$S1 = (Da^2 \times \pi/4) - (Db^2 \times \pi/4) \quad (1)$$
$$= (Da^2 - Db^2) \times \pi/4$$

At the pressure receiving area S1 the pressure receiving portion 19G normally receives the pilot pressure P from the pilot conduit 27. As the pilot pressure P increases, the spool 19 slides in the direction of arrow C against the biasing force of a return spring 24 to be described later.

Numeral 20 denotes an axial bore formed axially as a bottomed bore in the spool 19. One end of the axial bore 20 is closed as a bottom portion and the opposite end thereof is open to an end face of the spool 19. As shown in FIG. 4, the axial bore 20 is formed to have a relatively small diameter Dc (Dc<Db<Da) and the bottom portion of the axial bore 20 serves as a second pressure receiving portion 20A which, at the following pressure receiving area S2, receives the internal pressure of an oil chamber 22 to be described later:

$$S2 = Dc^2 \times \pi/4 \quad (2)$$

The piston 21, which is inserted slidably into the axial bore 20, closes the open end of the axial bore 20 constantly and one end thereof defines an oil chamber 22 between it and the bottom of the axial bore 20. As shown in FIG. 3, the opposite end of the piston 21 projects axially from an end face of the spool 19 and is in abutment against the closed end 13B of the spool sliding bore 13 to receive a hydraulic reaction force induced by the pilot pressure P in the oil chamber 22.

Numeral 23 denotes a small hole formed as an oil passage radially of the spool 19 so as to be positioned in the oil chamber 22. At the position of the annular groove 19E the small hole 23 is open to the outer periphery surface of the spool 19. According to a slide position of the spool 19 the small hole 23 permits the oil chamber 22 to selectively establish and block communication with the tank port 15C (oil groove 14C) and the pilot port 15B (oil groove 14B).

In this case, the communication of the oil chamber 22 with the tank port 15C and the pilot port 15B through the small hole 23 is selectively established and blocked with zero lap by the spool 19. To this end, an axial length of the annular groove 19E between the lands 19B and 19C is set at a value approximately equal to the spaced distance between the oil grooves 14B and 14C. When the oil chamber 22 is brought into communication with the pilot port 15B through the small hole 23, the annular groove 19E permits the oil chamber 22 to block its communication with the tank port 15C almost simultaneously, while when the oil chamber 22 is brought into communication with the tank port 15C, the communication with the pilot port 15B is blocked almost simultaneously.

Numeral 24 denotes a return spring which constitutes a biasing means. The return spring 24 is disposed within the spring chamber 17 at a position between the lid member 16 and the spool 19. One end of the return spring 24 is fitted on an outer periphery of the stopper 18 and the opposite end thereof is mounted on one end of the spool 19 by fitting or any other suitable means. With a biasing force Fa acting in the direction of arrow D, the return spring 24 urges the spool 19 toward the closed end 13B constantly, whereby the volume control valve 11 is held in its small volume position (b) shown in FIG. 1.

Numeral 25 denotes a drain conduit for discharging drain (leak oil) from the hydraulic motor 3 to the tank 2 side, and numeral 26 denotes a tank conduit which connects the tank ports 15A, 15C, and 15F of the volume control valve 11 to the tank 2 at all times.

Numeral 27 denotes a pilot conduit connected to the pilot port 15B of the volume control valve 11. The pilot conduit 27 is connected to the center by-pass port 8A of the counterbalance valve 6 to conduct the motor drive pressure (load pressure) of the hydraulic motor 3, as pilot pressure P, to the pilot port 15B of the volume control valve 11.

Numeral 28 denotes a high pressure conduit which connects the shuttle valve 9 to the high pressure port 15D of the volume control valve 11. The high pressure conduit 28 conducts a high pressure oil selected from the conduit portions 4A2 and 4B2 of the main conduits 4A and 4B by the shuttle valve 9 to the high pressure port 15D of the volume control valve 11.

Numeral 29 denotes a feed/discharge conduit which connects the oil chamber 10C of the servo-actuator 10 to the pressure oil feed/discharge port 15E of the volume control valve 11. Further, numeral 30 denotes another tank conduit connected to the center by-pass port 8A of the counterbalance valve 6. When the pressure control valve 8 of the counterbalance valve 6 returns to its neutral position (I), the tank conduit 30 connects the center by-pass port 8A to the tank 2, whereby the pilot pressure P within the pilot conduit 27 drops to the tank pressure level.

The hydraulic circuit for traveling of the hydraulic excavator provided with the volume control valve 11 according to this embodiment is constructed as above. Next, the operation thereof will be described below.

First, when the operator of the hydraulic excavator switches the directional control valve 5 shown in FIG. 1 from its neutral position (I) to the drive position (II) for traveling the vehicle, the pressure oil provided from the hydraulic pump 1 is supplied as a motor drive pressure to the hydraulic motor 3 from the main conduit 4A. At this time, with a differential pressure between the conduit portions 4A1 and 4B1, the pressure control valve 8 of the counterbalance valve 6 switches from the neutral position (I) to the drive position (II), allowing return oil from the hydraulic motor 3 to be discharged from the main conduit 4B (conduit portion 4B1) to the tank 2 through the pressure control valve 8, whereby the vehicle is driven to travel in the forward direction.

On the other hand, when the directional control valve 5 for traveling is switched from the neutral position (I) to the drive position (III), the motor drive pressure is fed to the main conduit 4B side, whereby the hydraulic motor 3 is operated in the opposite direction to the above direction. In this case, the pressure control valve 8 switches from the neutral position (I) to the drive position (III) allowing return oil from the hydraulic motor 3 to be discharged from the main conduit 4A (conduit portion 4A1) to the tank 2 through the pressure control valve 8, whereby the vehicle is driven to travel in the backward direction.

When the pressure control valve 8 switches from the neutral position (I) to the drive position (II) or (III) during vehicular running, the center by-pass port 8A of the pressure control valve 8 is connected to the conduit portion 4A1 or 4B1 on the oil pressure source side, whereby the motor drive pressure is supplied, as pilot pressure P, to the pilot port 15B of the volume control valve 11 from the pilot conduit 27.

In the actuator-side conduit portions 4A2 and 4B2 a motor drive pressure is selected by the shuttle valve 9 and the pressure oil thus selected is conducted through the high pressure conduit 28 to the high pressure port 15D of the volume control valve 11.

The pilot pressure P fed to the pilot port 15B of the volume control valve 11 acts on the pressure receiving portion 19G of the spool 19 shown in FIG. 2 and, with a pushing force F1 and at the pressure receiving area S1 based on Expression 1, pushes the spool 19 in the direction of arrow C against the biasing force Fa of the return spring 24.

$$F1 = S1 \times p \qquad (3)$$

Further, the biasing force Fa of the return spring 24 is preset so as to meet the following relationship:

$$Fa = S1 \times P1 = (S1 + S2) \times P2 \qquad (4)$$

Figure 5:
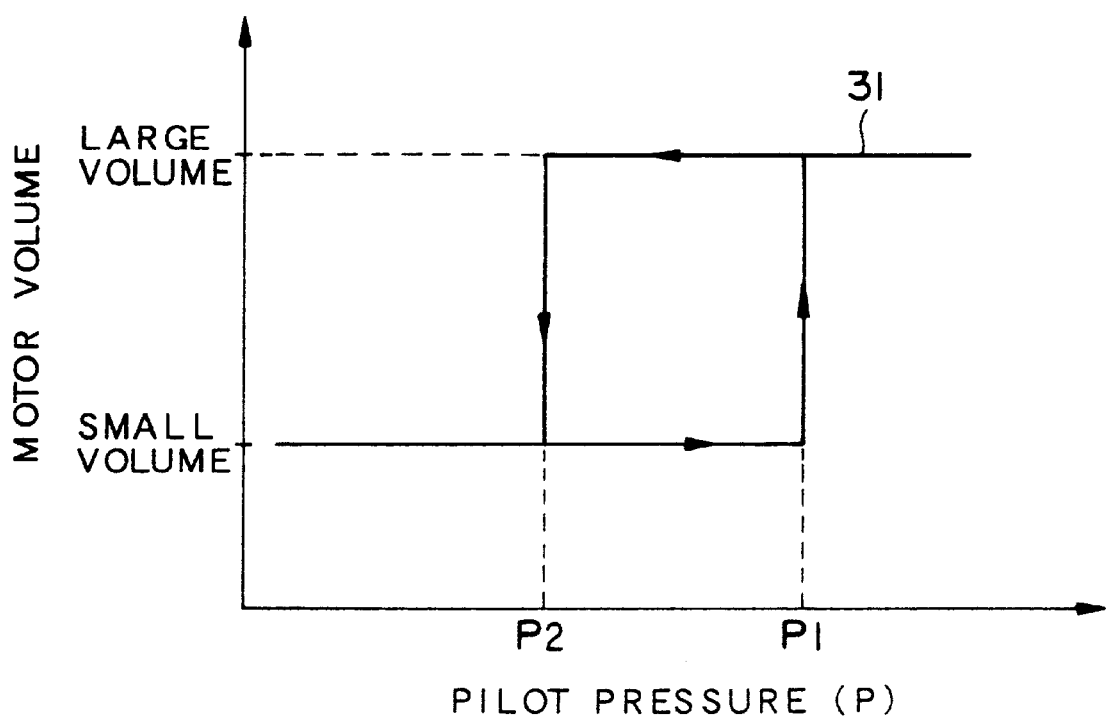
FIG. 5 is a characteristic diagram showing a hysteresis characteristic of a switching control pressure used by the volume control valve.

When the pilot pressure P varies between pressures P1 and P2 (P1>P2) as indicated by a characteristic line 31 in FIG. 5, the switching control pressure for the motor volume is given a hysteresis characteristic.

More specifically, when the vehicle goes up a slope, the load pressure of the hydraulic motor 3 rises and so does the pilot pressure P up to a pressure level of P1 or higher. At this time, the spool 19 causes the return spring 24 to be deflected as in FIG. 3 with the pushing force F1 (F1=S1×P1) acting in the direction of arrow C through the pressure receiving portion 19G. And the spool 19 slides up to the stroke end at which it comes into abutment against the stopper 18.

As a result, the volume control valve 11 switches from the small volume position (b) to the large volume position (a) shown in FIG. 1 against the biasing force Fa of the return spring 24, whereby the high pressure port 15D of the volume control valve 11 is cut off from the pressure oil feed/discharge port 15E by the land 19D of the spool 19. At this time, the pressure oil feed/discharge port is brought into communication with the tank port 15F (tank conduit 26).

Consequently, the oil chamber 10C of the servo-actuator 10 is connected to the tank 2 through the feed/discharge conduit 29, pressure oil feed/discharge port 15E of the volume control valve 11 and the tank conduit 26, and the volume varying section 3A of the hydraulic motor 3 is tilted in the direction of arrow A, i.e., toward a large tilt angle side, by means of the spring 10B. As a result, the motor volume is controlled to a large volume so that the hydraulic motor 3 can rotate at a low speed with a high torque to permit the vehicle to go up a slope.

At this time, in the volume control valve 11, the oil chamber 22 in the spool 19 is connected to the pilot port 15B through the small hole 23, annular groove 19E and oil groove 14B, as shown in FIG. 3, whereby a pilot pressure P of, say, P1 or higher is fed into the oil chamber 22.

The pressure receiving portion 19G of the spool 19 receives the pilot pressure P at the pressure receiving area S1. Likewise, the pressure receiving portion 20A in the oil chamber 22 receives the pilot pressure P at the pressure receiving area S2 based on Expression 2. Thus, the spool 19 continues to receive the pilot pressure P at a total pressure receiving area (S1+S2) of both pressure receiving portions 19G and 20A.

Consequently, even if the volume of the hydraulic motor 3 changes from a small to a large volume and the motor drive pressure (load pressure) drops slightly, insofar as the pilot pressure P is not lower than the pressure P2, the spool 19 causes the return spring 24 shown in FIG. 3 to be deflected in the direction of arrow C with the following pushing force F2:

$$F2 = (S1 + S2) \times P \qquad (5)$$

$$F2 \geq Fa \text{ provided } P \geq P2 \qquad (6)$$

thereby retaining the volume control valve 11 in the large volume position (a).

On the other hand, when the vehicular slope running is over and has shifted to a straight running on a level land, the pilot pressure P drops to a level below P2 in FIG. 5. As a result, the pushing force F2 of the spool 19 becomes smaller than the biasing force Fa of the return spring 24, so that the spool 19 is pushed back in the direction of arrow D by the return spring 24 and slides up to its initial position shown in FIG. 2, and the volume control valve 11 again returns to its small volume position (b).

At this time, the high pressure port 15D of the volume control valve 11 is brought into communication with the pressure oil feed/discharge port 15E. Consequently, pressure oil from the high pressure conduit 28 selected by the shuttle valve 9 is supplied into the oil chamber 10C of the servo-actuator 10 through the feed/discharge conduit 29, allowing the volume varying section 3A of the hydraulic motor 3 to be tilted in the direction of arrow B, i.e., toward the small tilt angle side, by the tilting piston 10A. In this way the volume of the hydraulic motor 3 can be controlled to a small volume suitable for level land traveling and hence it is possible to let the vehicle run at a high speed with a low torque.

At this time, in the volume control valve 11, the oil chamber 22 defined within the spool 19 is connected to the tank port 15C through the small hole 23 and the oil groove 14C, as shown in FIG. 2, so that the internal pressure of the oil chamber 22 drops to the tank pressure level. In the spool 19, therefore, without receiving the pilot pressure P on the pressure receiving portion 20A side in the oil chamber 22, the pilot pressure P is received at the pressure receiving area S1 on only the pressure receiving portion 19G side, whereby the pressure receiving area of the spool 19 is reduced to the pressure receiving area S1.

As a result, even if the volume of the hydraulic motor 3 changes from a large to a small volume and the motor drive pressure (load pressure) increases slightly, the spool 19 merely pushes the return spring 24 in the direction of arrow C in FIG. 2 with a pushing force F1 based on the following Expression 7 until the pilot pressure P reaches the pressure P1:

$$F1 < Fa \text{ provided } P < P1 \qquad (7)$$

Then, the spool 19 is urged to its initial position by the return spring 24 and holds the volume control valve 11 in the small volume position (b).

Thus, according to this embodiment, the land 19A of the largest diameter is formed on one end side of the spool 19 to provide the annular pressure receiving portion 19G, allowing the pressure receiving portion 19G to receive the pilot pressure P from the pilot port 15B at the pressure receiving area S1. The piston 21 is inserted slidably into the bottomed axial bore 20 which extends axially from the opposite end of the spool 19, to define the oil chamber 22. With the small hole 23, the oil chamber 22 is established and blocked communication selectively between the tank port 15C and the pilot port 15B according to a slide position of the spool 19.

While the spool 19 is in its initial position shown in FIG. 2, that is, while the volume control valve 11 is in the small volume position (b), the oil chamber 22 is brought into communication with the tank port 15C to decrease the pressure receiving area of the spool 19 for the pilot pressure P to only the pressure receiving area S1 on the pressure receiving portion 19G. As a result, until the motor drive pressure (pilot pressure P) rises above the pressure P1, the spool 19 can be held in its initial position by the return spring 24 and hence it is possible to hold the volume control valve 11 at the small volume position (b).

When the motor drive pressure rises above the pressure P1, the spool 19 slides up to the stroke end against the biasing force of the return spring 24. As a result, the pilot pressure P from the pilot port 15B is introduced into the oil chamber 22 through the small hole 23, whereby the pressure receiving area of the spool 19 can be increased by an amount corresponding to the pressure receiving area S2 of the pressure receiving portion 20A in the oil chamber 22 and thus it is possible to continue receiving the pilot pressure P at the total pressure receiving area (S1+S2).

Therefore, even when the volume of the hydraulic motor 3 increases from a small to a large volume and the motor drive pressure drops slightly, it is possible to hold the spool 19 at the stroke end shown in FIG. 3 and at the large pressure receiving area (S1+S2). By keeping the volume control valve 11 at the large volume position (a) until the motor drive pressure drops to below the pressure P2 in a level land vehicular running, it is possible to maintain the volume of the hydraulic motor 3 at a large volume.

Thus, according to this embodiment, the hysteresis characteristic shown in FIG. 5 can be imparted to the switching control pressure of the volume control valve 11 in the ranges of pressures P1 and P2, whereby it is possible to prevent the occurrence of a hunching phenomenon even at the time of switching from one to another volume. That is, volume control can be performed automatically in a stable state. Besides, since the volume control valve 11 can be composed of the valve housing 12, spool 19, piston 21, and return spring 24, it is not only possible to decrease the number of components used and thereby improve the assembling work efficiency but also possible to form the whole in a compact shape and thereby attain the reduction of size.

Moreover, since the spool 19 is formed as a stepped spool having large diameter on one end thereof and the pressure receiving portion 19G for the pilot pressure P is formed on the outer periphery side of the spool 19 at the position of the land 19A having the largest diameter, it is possible to shorten the axial length of the spool 19 and hence possible to reduce the entire size of the volume control valve 11.

Further, since the oil chamber 22 defined within the spool 19 is established and blocked communication between the pilot port 15B and the tank port 15C substantially with zero lap at the time of selective control of the volume control valve 11, the pressure receiving area of the spool 19 for the pilot pressure P can be increased or decreased instantaneously at the time of switching from one to another volume and the spool 19 can be slid smoothly between the initial position and the stroke end. Additionally, the occurrence of a hunching phenomenon in the motor volume switching operation can be prevented to a satisfactory extent and the volume control can be effected in a stable manner.

Figure 6:
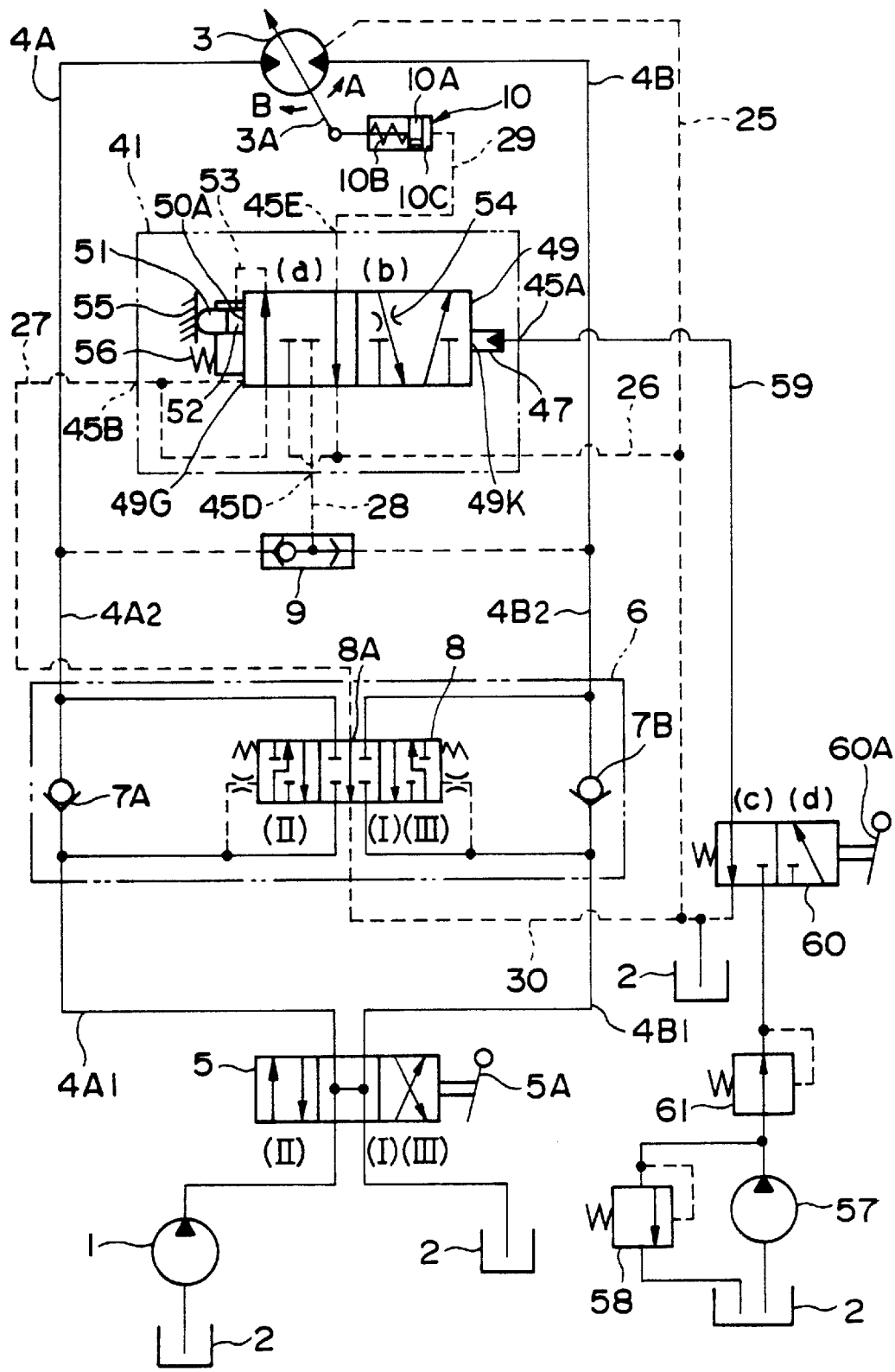
FIG. 6 is a hydraulic circuit diagram for traveling of a hydraulic excavator to which a volume control valve according to a second embodiment of the present invention is applied.
Figure 7:
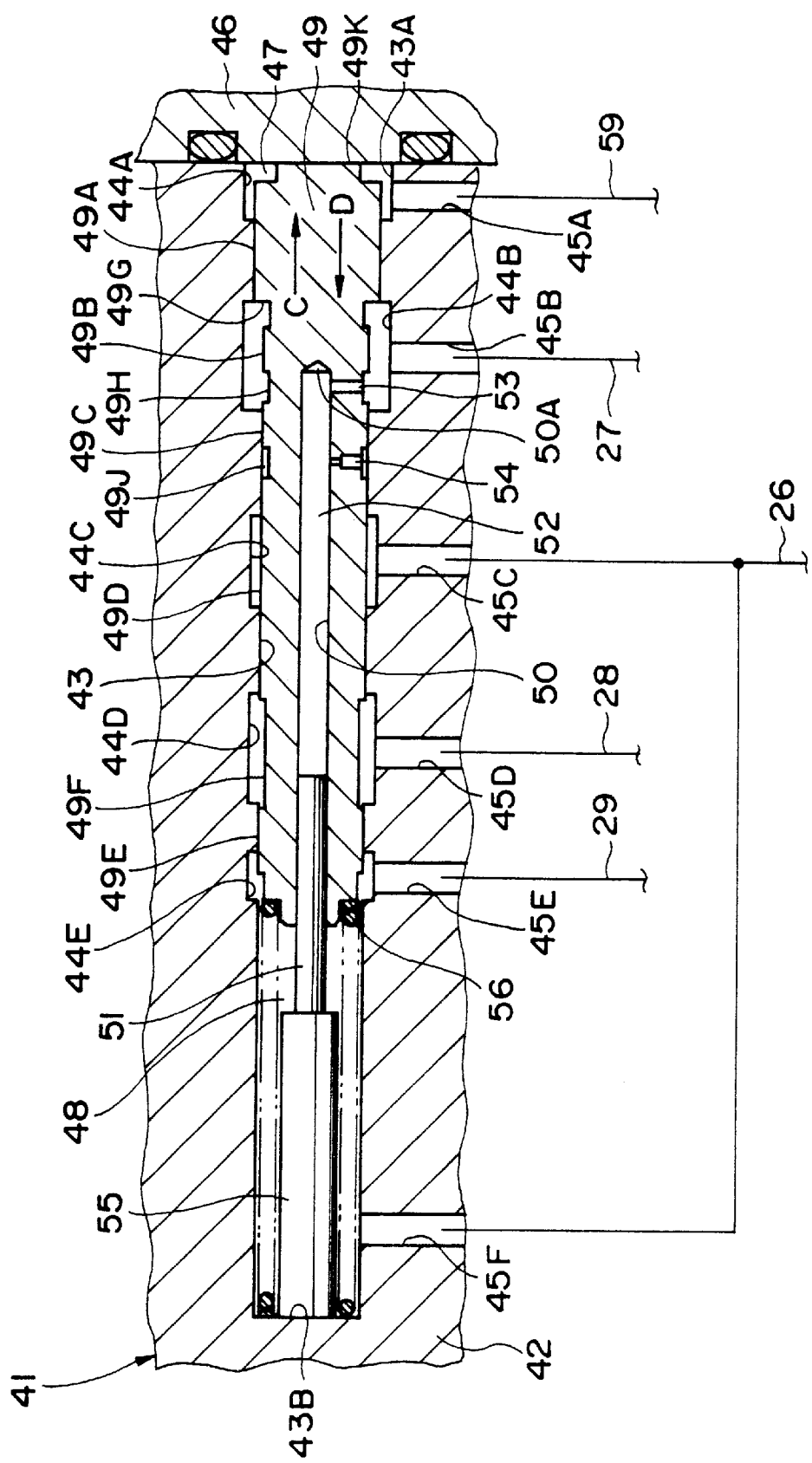
FIG. 7 is a longitudinal sectional view showing a state in which the volume control valve illustrated in FIG. 6 is in a large volume position.
Figure 8:
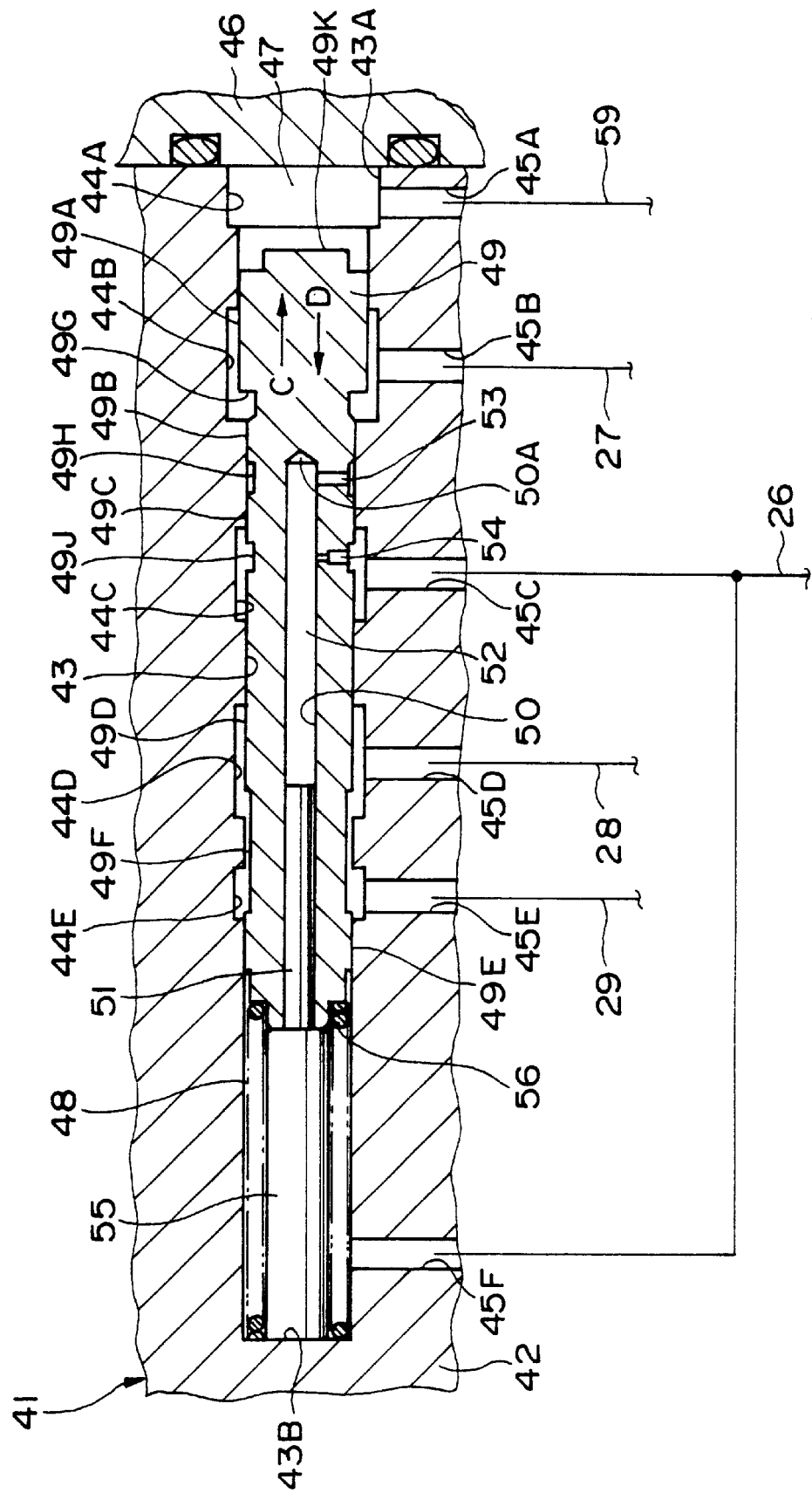
FIG. 8 is a longitudinal sectional view of the volume control valve, showing a state in which a spool has slid up to a stroke end thereof and switched to a small volume position.

Referring now to FIGS. 6 to 8, there is illustrated a volume control valve according to the second embodiment of the present invention. This embodiment is characteristic in that the volume control valve is further provided with an external command pressure port as an additional port and an external command pressure is selected by an external selector means, whereby a control for fixing the motor volume to a large volume and an automatic volume switching control are performed selectively in accordance with operating conditions. In this second embodiment, the same components as in the first embodiment are identified by the same reference numerals as in the first embodiment and explanations thereof will here be omitted.

In the figures, the reference numeral 41 denotes a volume control valve according to this second embodiment. As shown in FIG. 7, the volume control valve 41 comprises a valve housing 42, a spool 49 and a piston 51 to be described later. The volume control valve 41 has almost the same construction as that of the volume control valve 11 described in the first embodiment. But the volume control valve 41 is controlled selectively between the large volume position (a) and the small volume position (b) in accordance with both an external command pressure provided through a command pressure conduit 59 to be described later and the pilot pressure P from the pilot conduit 27.

In the valve housing 42 of the volume control valve 41 is formed a stepped, spool sliding bore 43 having an open end 43A on one end side thereof and a closed end 43B on the opposite end side. The spool sliding bore 43 is circumferentially formed with annular oil grooves 44A, 44B, 44C, 44D, and 44E in axially spaced positions.

Further, an external command pressure port 45A, a pilot port 45B, tank ports 45C and 45F, a high pressure port 45D, and a pressure oil feed/discharge port 45E are formed in the valve housing 42 in an axially spaced relation to one another. The ports 45A to 45E are in communication with the interior of the spool sliding bore 43 through the oil grooves 44A to 44E.

Numeral 46 denotes a lid member which closes the open end 43A of the spool sliding bore 43 and which constitutes a part of the valve housing 42. Between the lid member 46 and one end face of the spool 49 to be described later there is formed an external command pressure chamber 47 so as to be positioned within the oil groove 44A.

Numeral 48 denotes a spring chamber formed between the closed end 43A of the spool sliding bore 43 and the opposite end face of the spool 49, with a return spring 56 and a stopper 55 both to be described later being disposed within the spring chamber 48. The spring chamber 48 is connected to the tank 2 through the tank port 45F and the tank conduit 26 at all times.

The spool 49 is inserted into the spool sliding bore 43 of the valve housing 42. The spool 49 is circumferentially formed with lands 49A, 49B, 49C, 49D, and 49E in an axially spaced relation to one another, as shown in FIGS. 7 and 8. Between the lands 49D and 49E of the spool 49 is formed an annular groove 49F which establishes and blocks communication between the oil grooves 44D and 44E. Through the annular groove 49F and the land 49E the spool 49 selectively establishes and blocks communication of the pressure oil feed/discharge port 45E with the high pressure port 45D and the tank port 45F.

The spool 49 is formed as a stepped spool whose land 49A side positioned at one end is the largest in diameter. A stepped portion (end face side) of the land 49A, which is opposed to the land 49B, serves as an annular first pressure receiving portion 49G which receives the pilot pressure from the pilot conduit 27. Like the pressure receiving portion 19G of the spool 19 in the first embodiment, the pressure receiving portion 49G has the pressure receiving area S1 based on Expression 1.

On the outer periphery side of the spool 49 an annular narrow groove 49H is formed between the lands 49B and 49C and an annular narrow groove 49J is formed between the lands 49C and 49D. The narrow grooves 49H and 49J are positioned on open end of oil holes 53 and 54 to be described later. With the narrow grooves 49H and 49J, an oil chamber 52 to be described later is established and blocked communication with the pilot port 45B and the tank port 45C substantially with zero lap.

More specifically, when the narrow groove 49H establishes (blocks) communication with the oil groove 44B, the narrow groove 49J is blocked (established) communication with the oil groove 44C almost simultaneously. Further, the end face at one end located on the land 49A side of the spool 49 serves as a command pressure receiving portion 49K which receives an external command pressure in a direction reverse to the pressure receiving portion 49G. Within the external command pressure chamber 47 the command pressure receiving portion 49K has a pressure receiving area S3 based on Expression 8 which will be referred to later.

Numeral 50 denotes a bottomed axial bore formed in the spool 49 and extending axially of the spool. One end side of the axial bore 50 is closed as a bottom portion, while the opposite end thereof is open to an end face of the spool 49. Almost similarly to the axial bore 20 described in the first embodiment, the axial bore 50 is provided on its bottom side with a second pressure receiving portion 50A which receives, at a pressure receiving area S2, the internal pressure of an oil chamber 52 which will be described later.

Numeral 51 denotes a piston inserted slidably into the axial bore 50. The piston 51 closes an open end of the axial bore 50 at all times and one end thereof defines an oil chamber 52 between it and the pressure receiving portion 50A of the axial bore 50. As shown in FIG. 7, the opposite end of the piston 51 projects axially from an end face of the spool 49 and is in abutment against an end face of the stopper 55 to receive a hydraulic reaction force induced by the pilot pressure P in the oil chamber 52.

Numerals 53 and 54 denote oil holes formed radially of the spool 49 so as to be positioned in the oil chamber 52. The oil holes 53 and 54 are open to the outer periphery surface of the spool 49 in the positions of the narrow grooves 49H and 49J. The oil holes 53, 54 and the narrow grooves 49H, 49J constitute oil passages which selectively establish and block communication of the oil chamber 52 with the pilot port 45B (oil groove 44B) and the tank port 45C (oil groove 44C) according to a slide position of the spool 49.

In this case, the oil hole 53 is established and blocked communication with the pilot port 45B through the narrow groove 49H and the oil groove 44B, while the oil hole 54 is established and blocked communication with the tank port 45C through the narrow groove 49J and the oil groove 44C. With zero lap, the oil holes 53 and 54 establish and block communication of the oil chamber 52 with the pilot port 45B and the tank port 45C upon sliding displacement of the spool 49. Therefore, the narrow grooves 49H and 49J, which communicate with the oil holes 53 and 54 constantly, are formed at a predetermined spacing (axial spacing) which is determined beforehand in accordance with the spaced distance between the oil grooves 44B and 44C.

Consequently, when the narrow groove 49H comes into communication with the oil groove 44B, the narrow groove 49J is cut off communication from the oil groove 44C almost simultaneously. Likewise, when the narrow groove 49J communicates with the oil groove 44C, the narrow groove 49H is cut off communication from the oil groove 44B almost simultaneously.

The oil hole 54 has a throttle passage which is smaller in diameter than the oil hole 53. As shown in FIG. 8, the oil hole 54 functions to prevent the pressure oil in the oil chamber 52 from jetting to the tank port 45C when the oil chamber 52 is brought into communication with the tank port 45C and thereby prevent the occurrence of a surge pressure on the tank port 45C.

The stopper 55 is provided within the valve housing 42 so as to be positioned on the closed end 43B of the spool sliding bore 43. The stopper 55 is constituted by a cylindrical rod for example and projects from the closed end 43B side of the spool sliding bore 43 toward the interior of the spring chamber 48. One end of the stopper 55 is in abutment against the opposite end of the piston 51. Upon siding displacement of the spool 49 as in FIG. 8, the stopper 55 comes into abutment against an end face of the spool 49 to delimit the stroke end of the spool 49.

Numeral 56 denotes a return spring positioned between the valve housing 42 and the spool 49 and constituting a biasing means within the spring chamber 48. One end of the return spring 56 is secured to an end portion of the spool 49 by fitting or any other suitable means. The opposite end side of the return spring 56 is fitted on an outer periphery of the stopper 55 and is abutted against the closed end 43B of the spool sliding bore 43. With a biasing force Fb, the return spring 56 urges the spool 49 in the direction of arrow C constantly, whereby the volume control valve 41 is held in its large volume position (a) shown in FIG. 6.

Numeral 57 denotes a pilot pump serving as an oil pressure source for external command pressure and numeral 58 denotes a relief valve which determines a maximum delivery pressure of the pilot pump 57. Upon development of an excess pressure on a delivery side of the pilot pump 57, the relief valve 58 opens for relief of the excess pressure to the tank 2.

Numeral 59 denotes a command pressure conduit connected to the external command pressure port 45A of the volume control valve 41 and numeral 60 denotes a pressure selector valve as a external selector means which connects the command pressure conduit 59 selectively to the tank 2 and the pilot pump 57. In accordance with a manual operation of the operating lever 60A performed, for example, by the operator of the hydraulic excavator, the pressure selector valve 60 is switched to either a fixed volume position (c) or an automatic switching position (d).

While the pressure selector valve 60 is held in the fixed volume position (c), the command pressure conduit 59 is connected to the tank 2, so that the pressure of the external command pressure chamber 47 in the volume control valve 41 is held at the tank pressure level. Consequently, the spool 49 is urged to its initial position shown in FIG. 7 by the return spring 56 and the volume control valve 41 is held in its large volume position (a) shown in FIG. 6.

On the other hand, while the pressure selector valve 60 is held in the automatic switching position (d), the command pressure conduit 59 is connected to the pilot pump 57 and an external command pressure having a pressure value Pg set by a pressure reducing valve 61 which will be described later is fed to the external command pressure chamber 47 in the volume control valve 41. When the pressure receiving portion 49K in the external command pressure chamber 47 receives the external command pressure of the pressure value Pg, the spool 49 of the volume control valve 41 is pushed in the direction of arrow D against the biasing force of the return spring 56.

Numeral 61 denotes a pressure reducing valve disposed between the pilot pump 57 and the pressure selector valve 60. The pressure reducing valve 61 normally opens to prevent the external command pressure fed into the command pressure conduit 59 from rising to a level above the pressure valve Pg which satisfies Expressions 9 to 12 to be described later. When the delivery pressure from the pilot pump 57 rises above the pressure value Pg, the pressure reducing valve 61 closes to stop the supply of the delivery pressure.

Also according to this embodiment constructed as above there can be obtained about the same functions and effects as in the previous first embodiment. But particularly in this second embodiment the external command pressure port 45A and the external command pressure chamber 47 are formed in the volume control valve 41 and an external command pressure is selected and supplied by the pressure selector valve 60. This construction permits the following functions and effects to be obtained.

While the pressure selector valve 60 is held in the fixed volume position (c), the command pressure conduit 59 is connected to the tank 2 and the pressure of the external command pressure chamber 47 in the volume control valve 41 becomes the tank level. In the spool 49, therefore, a pushing force acting in the direction of arrow D is not developed by the command pressure receiving portion 49K, and the spool 49 continues to be urged to its initial position shown in FIG. 7 by means of the return spring 56, whereby the volume control valve 41 is held in the large volume position (a) shown in FIG. 6 and the volume of the hydraulic motor 3 is fixed to the large volume.

On the other hand, when the pressure selector valve 60 is switched from the fixed volume position (c) to the automatic switching position (d), an external command pressure having the pressure value Pg is fed to the external command pressure chamber 47 in the volume control valve 41 through the command pressure conduit 59 and the external command pressure port 45A.

Like the land 19A of the spool 19 referred to in the first embodiment, the land 49A of the spool 49 has an outside diameter Da shown in FIG. 4, so that the pressure receiving portion 49K of the spool 49 receives the external command pressure at a pressure receiving area S3 based on the following Expression 8:

$$S3 = (Da^2 \times \pi / 4) \tag{8}$$

When the external command pressure is set at the pressure value Pg, the spool 49 is pushed in the direction of arrow D with the following pushing force F3:

$$F3 = S3 \times Pg \tag{9}$$

The spool 49, in its initial position shown in FIG. 7, receives the pilot pressure P introduced from the pilot port 45B at its pressure receiving portion 49G and at the pressure receiving area S1. On the pressure receiving portion 50A side in the oil chamber 52 the spool 49 receives the pilot pressure P at the pressure receiving area S2. Consequently, the pushing force F2 based on Expression 5 acts on the spool 49 in the direction of arrow C in FIG. 7.

Since the return spring 56 urges the spool 49 in the direction of arrow C with the biasing force Fb, both pushing force F2 and biasing force Fb are exerted on the spool 49 in the arrow C direction, while in the direction of arrow D the pushing force F3 based on the external command pressure is exerted on the spool 49. When the following relationship is satisfied, the spool 49 slides up to the stroke end shown in FIG. 8 with the external command pressure of the pressure value Pg:

$$F3 > F2 + Fb \tag{10}$$

Thus, when the pilot pressure has dropped to a level below the pressure P2 as indicated by the characteristic line 31 in FIG. 5 and when the external command pressure of the pressure value Pg is fed to the external command pressure chamber 47, the spool 49 slides to the stroke end position shown in FIG. 8. Consequently, the position of the volume control valve 41 is shifted from the large volume position (a) to the small volume position (b) shown in FIG. 6.

In the stroke end state shown in FIG. 8, the oil chamber 52 in the spool 49 is connected to the tank port 45C through the oil hole 54 and the oil groove 44C and the internal pressure of the oil chamber 52 drops to the tank pressure level, so that, without receiving the pilot pressure P on the pressure receiving portion 50A in the oil chamber 52, the spool 49 receives the pilot pressure P on only the pressure receiving portion 49G at the pressure receiving area S1. Thus, the pressure receiving area of the spool 49 is decreased to the pressure receiving area S1.

As a result, both pushing force F1 based on Expression 3 and biasing force Fb act on the spool 49 in the direction of arrow C in FIG. 8, while in the direction of arrow D the spool 49 receives the pushing force F3 based on the external command pressure. Therefore, as long as the following relationship is satisfied, the volume control valve 41 is held at the small volume position (b) which is the stroke end:

$$F3 < F1 + Fb \tag{11}$$

Even in the case where the volume of the hydraulic motor 3 changes from large to small volume and the motor drive pressure (load pressure) increases slightly, the spool 49 stays at the stroke end shown in FIG. 8 under the relationship of Expression 11 until the pilot pressure P reaches the pressure P1.

Next, if in this state the pilot pressure P rises to a level above the pressure P1 shown in FIG. 5, the pushing force F1 generated in the pressure receiving portion 49G of the spool 49 and acting in the direction of arrow C becomes large to the following extent:

$$F3 < F1 + Fb \text{ provided } P \geqq P1 \tag{12}$$

Consequently, the spool 49 slides in the arrow C direction against the internal pressure of the external command pressure chamber 47 and returns to its initial position shown in FIG. 7. Accordingly, the volume control valve 41 returns to the large volume position (a) shown in FIG. 6.

In this state, the pressure receiving area of the spool 49 increases to the area of (S1+S2), so even when the motor drive pressure drops slightly with the change of the motor volume from small to large volume, the volume control valve 41 can be held at the large volume position (a) and it is possible to keep the motor volume large until the motor drive pressure (pilot pressure P) again decreases to a level below the pressure P2. Thus, also in this embodiment it is possible to obtain the hysteresis characteristic shown in FIG. 5.

In this embodiment, therefore, while the pressure selector valve 60 for external command pressure is held in the fixed volume position (c), the motor volume can be fixed to a large volume, whereby, for example, the vehicular steering operation can be done easily and hence it is possible to lighten the burden on the operator. When the position of the pressure selector valve 60 is switched to the automatic switching position (d), the volume control valve 41 can be controlled selectively and automatically according to increase or decrease of the motor drive pressure and it is possible to effect a self-pressure control for the motor volume appropriately.

Further, even when the pressure change-over timing in the oil chamber 52 involves a slight error caused by a machining error for example and there exists a section in which the pilot port 45B and the tank port 45C together communicate with the oil chamber 52, the pressure oil can be throttled by the oil hole 54 because the oil chamber 52 communicates with the tank port 45C through the oil hole 54 which is small in diameter. For example, it is possible to prevent the high pressure (pilot pressure P) in the oil chamber 52 from jetting to the tank port 45C side and thereby prevent the occurrence of a surge pressure on the tank port 45C.

Figure 9:
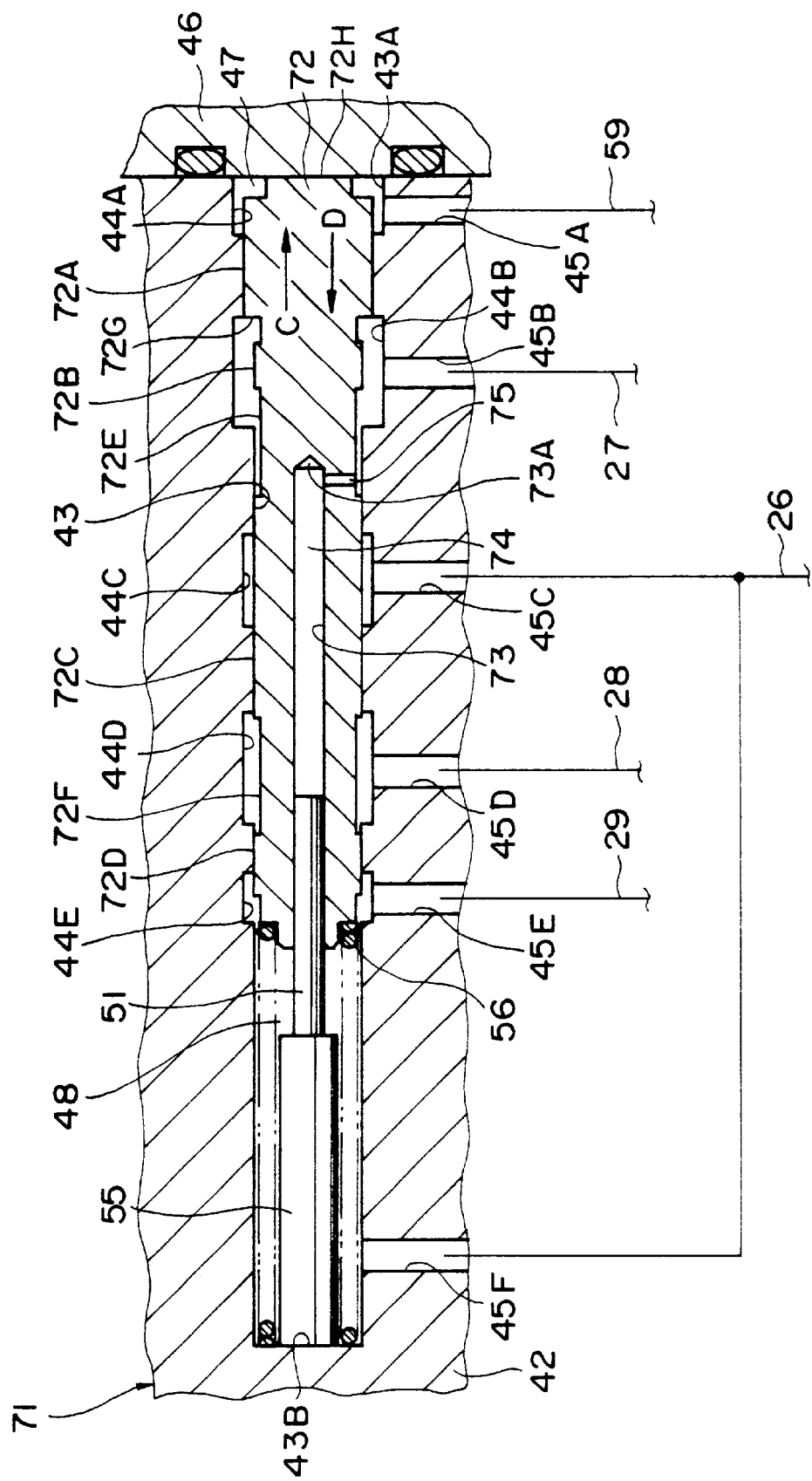
FIG. 9 is a longitudinal sectional view of a volume control valve according to a third embodiment of the present invention which valve is in a large volume position.

Referring now to FIG. 9, there is illustrated the third embodiment of the present invention, in which the same components as in the second embodiment are identified by the same reference numerals as in the second embodiment and explanations thereof will be omitted. This third embodiment is characteristic in that a spool 72 of a volume control valve 71 is formed in a shape different from the shape of the spool 49 used in the previous second embodiment.

Almost similarly to the spool 19 described in the first embodiment, the spool 72 is circumferentially provided with lands 72A, 72B, 72C, and 72D in an axially spaced relation to one another. Between the lands 72B and 72C is formed an annular groove 72E which establishes and blocks communication between the oil grooves 44B and 44C. Between the lands 72C and 72D of the spool 72 is formed another annular groove 72F which establishes and blocks communication between the oil grooves 44D and 44E. By the annular groove 72F and the land 72D the pressure oil feed/discharge port 45E is selectively established and blocked communication with the high pressure port 45D and the tank port 45F.

The spool 72 is formed as a stepped spool having a largest diameter on the land 72A positioned at one end of the spool. A stepped portion (end face side) of the land 72A opposed to the land 72B serves as an annular, first pressure receiving portion 72G which receives the pilot pressure from the pilot conduit 27. The first pressure receiving portion 72G has the pressure receiving area S1 based on Expression 1.

One end face positioned on the land 72A of the spool 72 serves as a command pressure receiving portion 72H which receives an external command pressure in a direction reverse to the pressure receiving portion 72G. Within the external command pressure chamber 47 the command pressure receiving portion 72H has the pressure receiving area S3 based on Expression 8.

In the spool 72 is formed a bottomed axial bore 73 which extends axially of the spool, and the piston 51 is inserted into the axial bore 73 to define an oil chamber 74. On the bottom side of the axial bore 73 is formed a second pressure receiving portion 73A which receives the internal pressure of the oil chamber 74 at the pressure receiving area S2 based on Expression 2.

On the other hand, a small hole 75 as an oil passage is formed radially of the spool 72. Almost similarly to the small hole 23 described in the first embodiment, the small hole 75 selectively establishes and blocks communication of the oil chamber 74 with the tank port 45C (oil groove 44C) and the pilot port 45B (oil groove 44B) according to a slide position of the spool 72.

Also in this embodiment constructed as above there can be obtained almost the same functions and effects as in the second embodiment.

Figure 10:
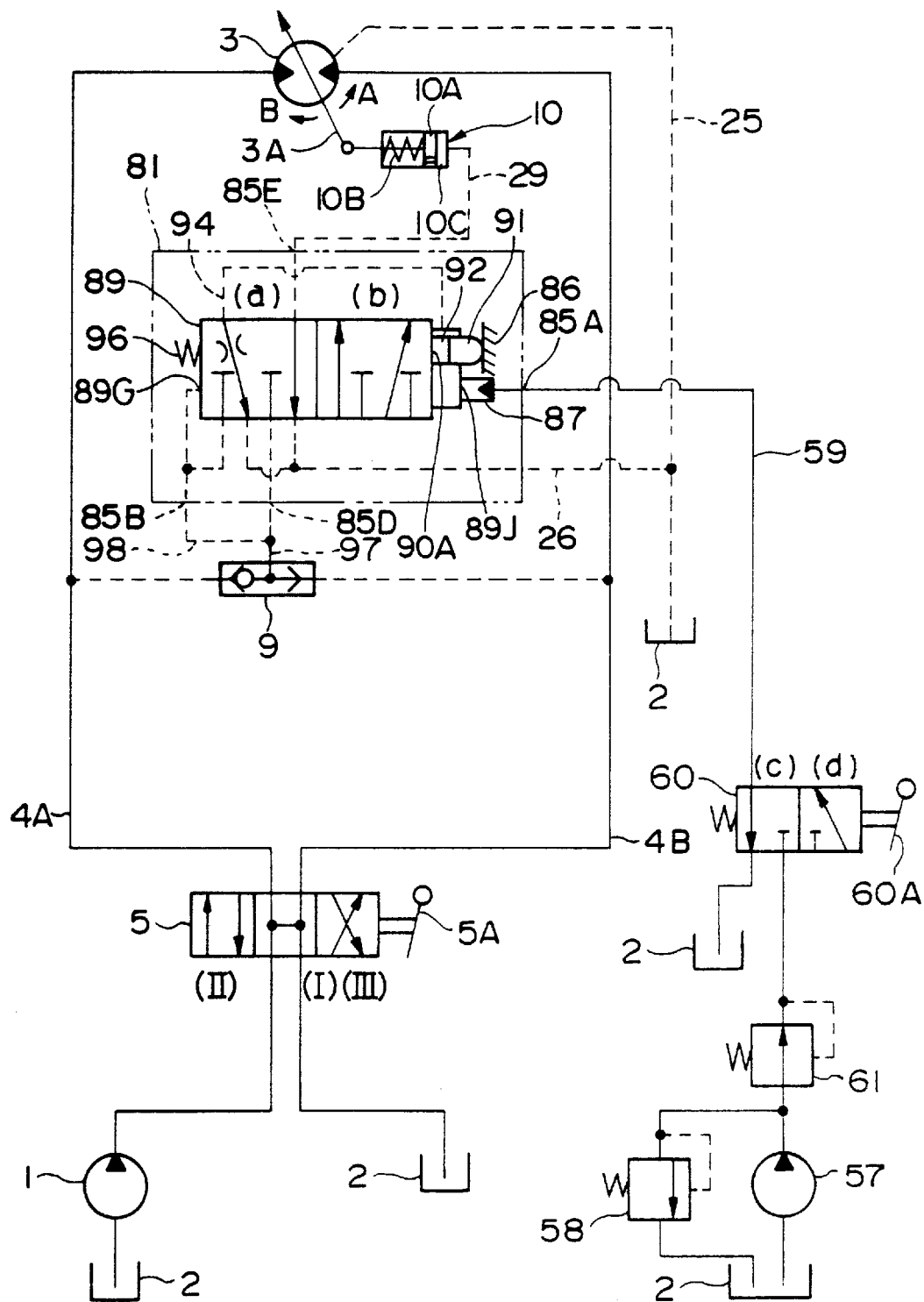
FIG. 10 is a hydraulic circuit diagram for traveling of a hydraulic excavator to which a volume control valve according to a fourth embodiment of the present invention is applied.
Figure 11:
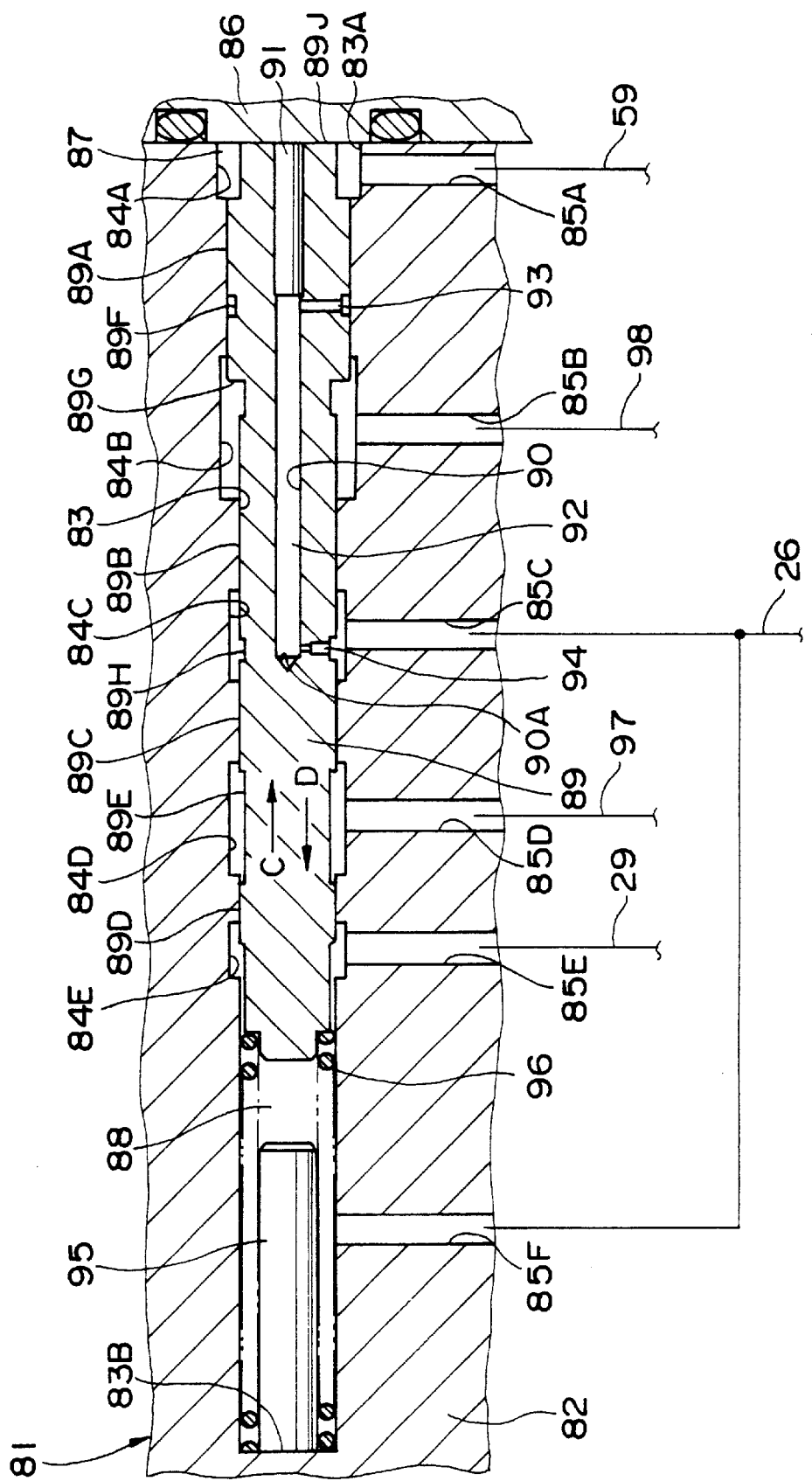
FIG. 11 is a longitudinal sectional view showing a state in which the volume control valve illustrated in FIG. 10 is in a large volume position.
Figure 12:
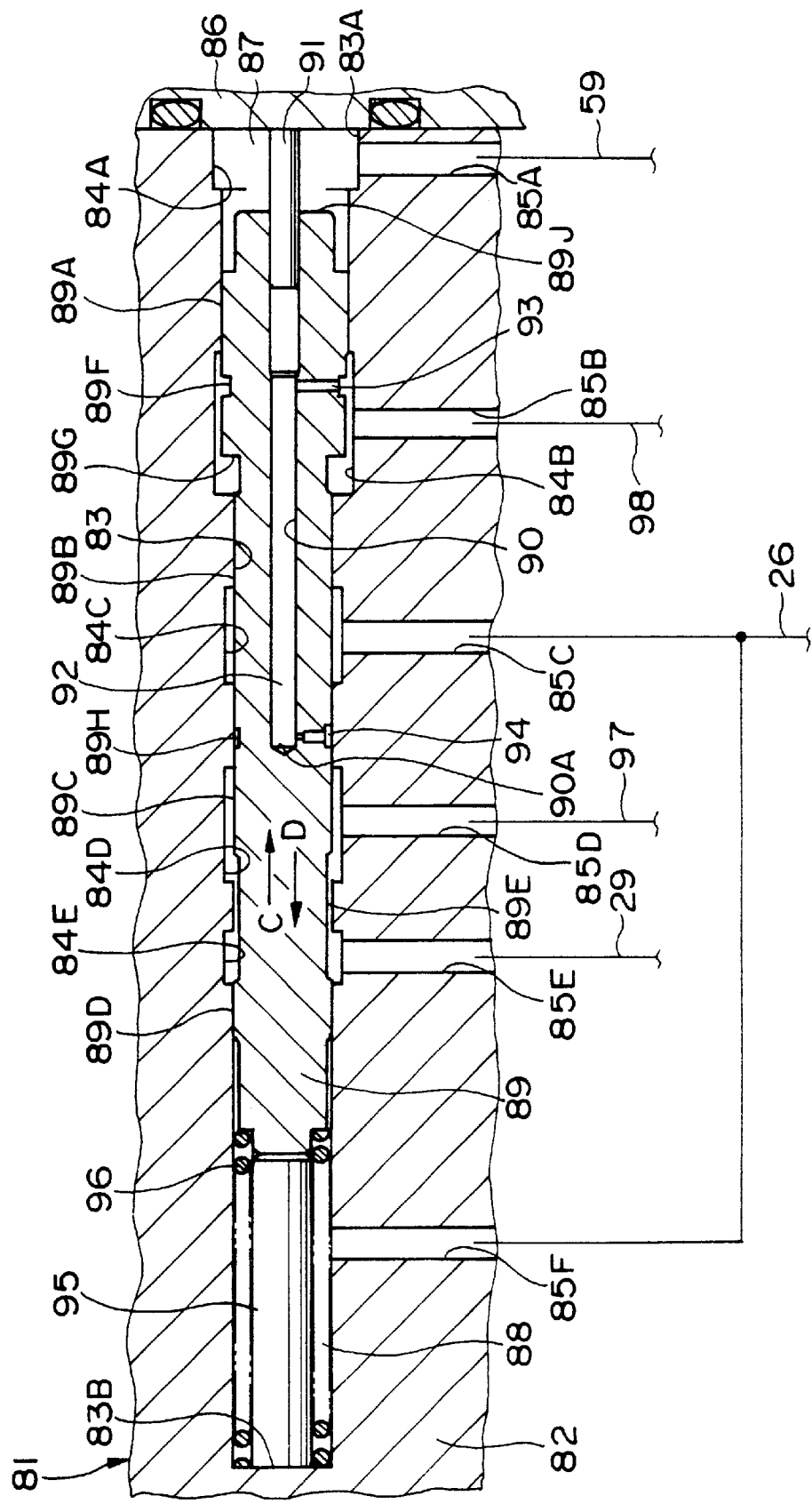
FIG. 12 is a longitudinal sectional view of the volume control valve, showing a state in which a spool has slid up to a stroke end thereof and switched to a small volume position.

Referring now to FIGS. 10 to 12, there is illustrated the fourth embodiment of the present invention. This fourth embodiment is characteristic in that a first pressure receiving portion is formed on an outer periphery side of a spool, an oil chamber is formed within an axial bore of the spool, and when a pilot pressure is introduced into the oil chamber, the pilot pressure is allowed to act on a second pressure receiving portion in the oil chamber in a direction reverse to the first pressure receiving portion, thereby changing the pilot pressure receiving area of the spool. In this fourth embodiment, the same components as in the second embodiment are identified by the same reference numerals as in the second embodiment and explanations thereof will be omitted.

In the figures, the reference numeral 81 denotes a volume control valve according to this embodiment. As shown in FIG. 11, the volume control valve 81 is composed of a valve housing 82, a spool 89 and a piston 91 to be described later. The volume control valve 81 has substantially the same construction as that of the volume control valve 41 described in the second embodiment and performs a selective control between a large volume position (a) and a small volume position (b) in accordance with the external command pressure provided from the command pressure conduit 59 and a pilot pressure P provided from a pilot conduit 98 to be described later.

In the valve housing 82 of the volume control valve 81 is formed a stepped, spool sliding bore 83 having an open end 83A on one end thereof and a closed end 83B on the opposite end, with annular oil grooves 84A, 84B, 84C, 84D, and 84E being formed on an outer periphery of the spool sliding bore 83 in axially spaced positions.

In the valve housing 82 are formed an external command pressure port 85A, a pilot port 85B, tank ports 85C and 85F, a high pressure port 85D, and a pressure oil feed/discharge port 85E. The ports 85A to 85E are in communication with the interior of the spool sliding bore 83 through the oil grooves 84A to 84E.

Numeral 86 denotes a lid member which closes the open end 83A side of the spool sliding bore 83. The lid member 86, which constitutes a part of the valve housing 82, defines an external command pressure chamber 87 between it and the end face at one end of the spool 89 to be described later so as to be positioned within the oil groove 84A.

Numeral 88 denotes a spring chamber formed between the closed end 83B of the spool sliding bore 83 and the end face at the opposite end of the spool 89. Within the spring chamber 88 are disposed a return spring 96 and a stopper 95 both to be described later. The spring chamber 88 is connected to the tank 2 at all times through the tank port 85F and the tank conduit 26.

The spool 89 is inserted into the spool sliding bore 83 in the valve housing 82. The spool 89 is circumferentially formed with lands 89A, 89B, 89C, and 89D in an axially spaced relation to one another, as shown in FIGS. 11 and 12. Between the lands 89C and 89D of the spool 89 is formed an annular groove 89E which establishes and blocks communication between the oil grooves 84D and 84E. With the annular groove 89E and the land 89D, the spool 89 selectively establishes and blocks communication of the pressure oil feed/discharge port 85E with the high pressure port 85D and the tank port 85F.

The spool 89 is formed as a stepped spool having a largest diameter on the land 89A side positioned at one end of the spool 89. On an outer periphery side of the land 89A is formed an annular narrow groove 89F in a position corresponding to an oil hole 93 to be described later. A stepped portion (end face side) of the land 89A opposed to the land 89B serves as an annular first pressure receiving portion 89G which receives a pilot pressure from the pilot conduit 98. Like the pressure receiving portion 19G of the spool 19 described in the first embodiment, the first pressure receiving portion 89G has the pressure receiving area S1 based on Expression 1.

On the outer periphery side of the spool 89 is formed an annular narrow groove 89H between the lands 89B and 89C. The narrow grooves 89F and 89H are positioned on open end sides of oil holes 93 and 94 to be described later and, with substantially zero lap, they establish and block communication of a later-described oil chamber 92 with the pilot port 85B and the tank port 85C. Therefore, when the narrow groove 89F establishes (blocks) communication with the oil groove 84B, the narrow groove 89H is blocked (established) communication with the oil groove 84C almost simultaneously.

Further, one end face located on the land 89A side of the spool 89 serves as a command pressure receiving portion 89J which receives the external command pressure in a direction reverse to the pressure receiving portion 89G. More specifically, at the pressure receiving area S3 based on Expression 8 the command pressure receiving portion 89J receives the external command pressure in the external command pressure chamber 87.

Numeral 90 denotes a bottomed axial bore formed in the spool 89 and extending axially of the spool. One end of the axial bore 90 is open to an end face of the spool 89, while the opposite end side thereof is closed as a bottom portion. The bottom side of the axial bore 90 serves as a second pressure receiving portion 90A. The second pressure receiving portion 90A is positioned within the oil chamber 92 to be described later and has a pressure receiving area S4 (S4<S1<S3) which is smaller than the pressure receiving area S1.

The piston 91, which is inserted slidably into the axial bore 90, closes the open end of the axial bore 90 constantly and one end thereof is in abutment against the surface of the lid member 86. The piston 91 defines the oil chamber 92 between the opposite end side thereof and the bottom of the axial bore 90.

The oil holes 93 and 94 are formed radially of the spool 89 so as to be positioned in the oil chamber 92 and are open to the outer periphery surface of the spool 89 at the positions of the narrow grooves 89F and 89H. The oil holes 93, 94 and the narrow grooves 89F, 89H constitute oil passages which selectively establish and block communication of the oil chamber 92 with the pilot port 85B (oil groove 84B) and the tank port 85C (oil groove 84C) according to a slide position of the spool 89.

In this case, the oil hole 93 is established and blocked communication with the pilot port 85B through the narrow groove 89F and the oil groove 84B, while the oil hole 94 is established and blocked communication with the tank port 85C through the narrow groove 89H and the oil groove 84C. Upon sliding displacement of the spool 89 the oil holes 93 and 94 establish and block communication of the oil chamber 92 with the pilot port 85B and the tank port 85C with zero lap. Therefore, the narrow grooves 89F and 89H communicating normally with the oil holes 93 and 94 are formed at a predetermined spacing (axial spacing) which is determined beforehand in accordance with the spaced distance between the oil grooves 84B and 84C.

The oil hole 94 constitutes a throttle passage which is smaller in diameter than the oil hole 93. When the oil chamber 92 is brought into communication with the tank port 85C, as shown in FIG. 1, the oil hole 94 prevents the pressure oil within the oil chamber 92 from jetting to the tank port 85C, thereby preventing the occurrence of a surge pressure on the tank port 85C.

The stopper 95 is provided within the valve housing 82 so as to be positioned on the closed end 83B of the spool sliding bore 83. The stopper 95 is constituted by, say, a cylindrical rod extending from the closed end 83B of the spool sliding bore 83 toward the interior of the spring chamber 88. When the spool 89 slides as in FIG. 12, one end of the stopper 95 comes into abutment against an end face of the spool 89 to delimit the stroke end of the spool.

The return spring 96 constitutes a biasing means disposed within the spring chamber 88 at a position between the valve housing 82 and the spool 89. One end of the return spring 96 is secured to an end portion of the spool 89 by fitting or any other suitable means, while the opposite end thereof is fitted on an outer periphery of the stopper 95 and is abutted against the closed end of the spool sliding bore 83. The return spring 96 urges the spool 89 constantly in the direction of arrow C with a biasing force Fc, whereby the volume control valve 81 is held at the large volume position (a) shown in FIG. 10.

Numeral 97 denotes a pilot conduit which connects between the shuttle valve 9 and the high pressure port 85D of the volume control valve 81, and numeral 98 denotes a pilot conduit branched from an intermediate position of the high pressure conduit 97 and connected to the pilot port of the volume control valve 81. The high pressure conduit 97 and the pilot conduit 98 supply a pressure oil (motor drive pressure) in either the main conduit 4A or 4B, whichever is at a higher level in the hydraulic motor 3 selected by the shuttle valve 9, to both high pressure port 85D and pilot port 85B in the volume control valve 81'.

Also in this embodiment constructed as above there can be obtained about the same functions and effects as in the second embodiment. But particularly in this embodiment the bottomed axial bore 90 is formed from one end of the spool 89 toward the opposite end thereof, and on the bottom side of the axial bore 90 is formed the pressure receiving portion 90A having a pressure receiving area S4 so as to be positioned within the oil chamber 92. When the pilot pressure P is introduced into the oil chamber 92, a pushing force F4 acting in the direction of arrow D is generated for the spool 89 by the pressure receiving portion 90A, as shown in Expression 13 which will be described later.

To be more specific, while the pressure selector valve 60 is in the fixed volume position (c), the volume control valve 81 is held at the large volume position (a) shown in FIG. 10 and the motor volume of the hydraulic motor 3 can be fixed to the large volume.

When the pressure selector valve 60 is switched from the fixed volume position (c) to the automatic switching position (d), an external command pressure having the pressure value Pg can be fed to the external command pressure chamber 87 in the volume control valve 81 through the command pressure conduit 59 and the external command pressure port 85A and it is possible to effect a volume control in accordance with the pilot pressure P which is a motor drive pressure.

Thus, in this embodiment, for example when the spool 89 is put in a sliding displacement up to the stoke end shown in FIG. 12 in accordance with an external command pressure and the position of the volume control valve 81 is switched to the small volume position (b), the pilot pressure P from the pilot port 85B is introduced into the oil chamber 92 in the spool 89, so in this state, the following pushing force F4 can be developed in the spool 89 in the direction of arrow D by the pressure receiving portion 90A formed within the oil chamber 92.

$$F4 = S4 \times P \tag{13}$$

On the other hand, the pressure receiving portion 89G formed on the outer periphery of the spool 89 receives the pilot pressure P from the pilot port 85B at the pressure receiving area S1 (S1>S4), the pushing force F1 based on Expression 3 is developed in the arrow C direction for the spool 89.

Therefore, in the state shown in FIG. 12 the spool 89 causes the following pushing force F5 to be developed in the arrow C direction and at this time the pressure receiving area of the spool 89 decreases to the area of (S1−S4).

$$F5 = F1 - F4 = (S1 - S4) \times P \tag{14}$$

Further, the biasing force Fc of the return spring 96 acts on the spool 89 in the arrow C direction and the pushing force F3 of the external command pressure based on Expression 9 acts on the spool 89 in the arrow D direction, so while the following relationship is satisfied, the spool 89 is put in sliding displacement up to the stroke end shown in FIG. 12 with an external command pressure of the pressure value Pg and the volume control valve 81 is held in the small volume position (b).

$$F3 > F5 + Fc \tag{15}$$

However, if in this state the pilot pressure P rises up to a level above the pressure P1 shown in FIG. 5, the arrow C pushing force F5 of the spool 89 based on Expression 14 becomes large, so when the following relationship is satisfied, the spool 89 is slidingly displaced in the arrow C direction against the internal pressure of the external command pressure chamber 87 and returns to the initial position shown in FIG. 11, while the volume control valve 81 returns to the large volume position (a) shown in FIG. 10.

$$F3 < F5 + Fc \text{ provided } P \geq P1 \tag{16}$$

In this state, the oil chamber 92 in the spool 89 communicates with the tank port 85C through the oil hole 94 and the pressure of the oil chamber 92 becomes equal to the tank pressure, so that the pushing force F4 based on Expression 13 becomes zero. Consequently, the pressure receiving area of the spool 89 becomes equal to the pressure receiving area S1 of the pressure receiving portion 89G and thus increases substantially.

Therefore, even in the case where the motor drive pressure decreases slightly as the motor volume of the hydraulic motor 3 varies from small to large volume, the volume control valve 81 can be held at the large volume position (a) and the motor volume can be kept large until the motor drive pressure (pilot pressure P) again decreases to a level below the pressure P2. In this way, also in this embodiment it is possible to obtain a hysteresis characteristic shown in FIG. 5.

Figure 13:
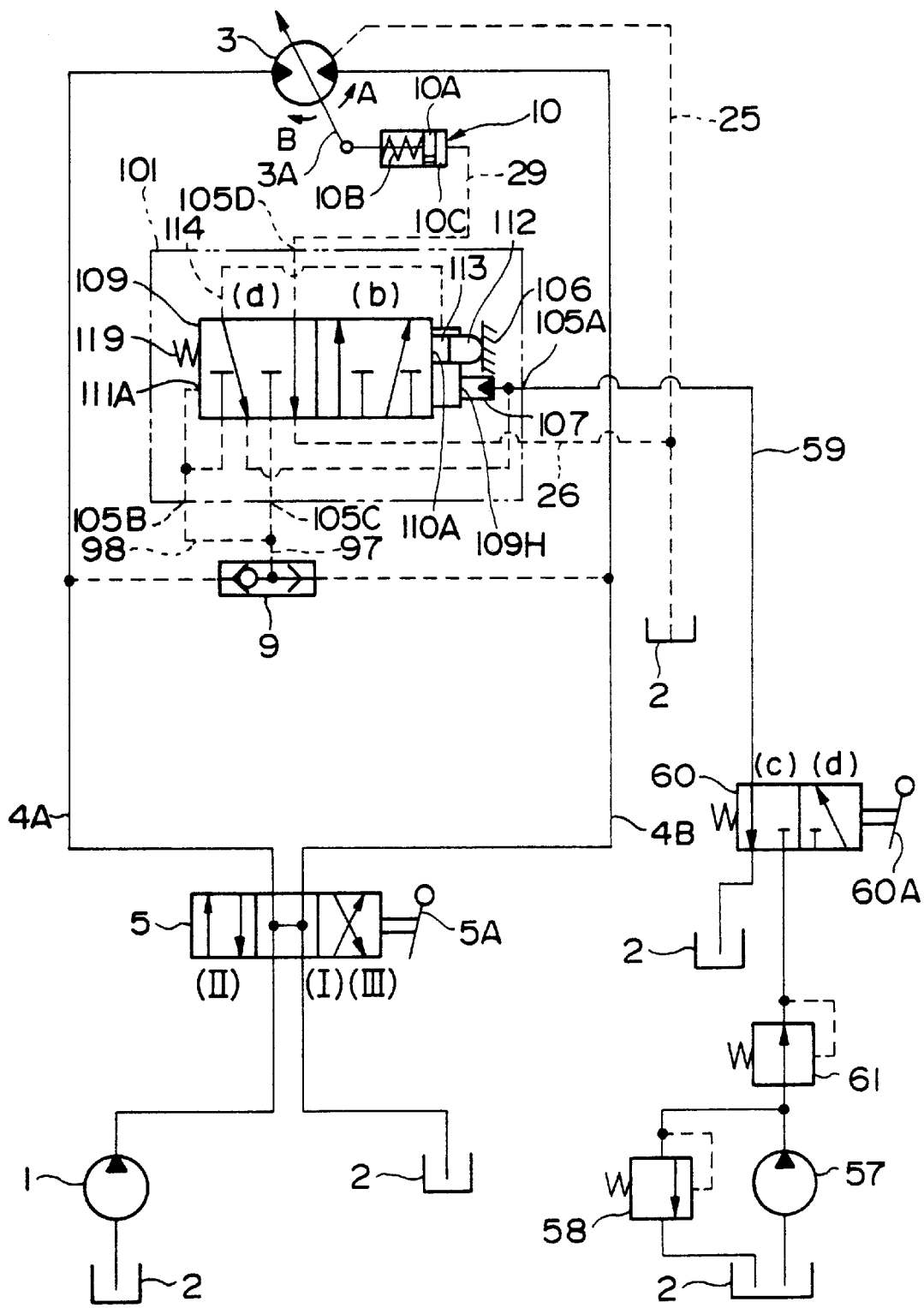
FIG. 13 is a hydraulic circuit diagram for traveling of a hydraulic excavator to which a volume control valve according to a fifth embodiment of the present invention is applied.
Figure 14:
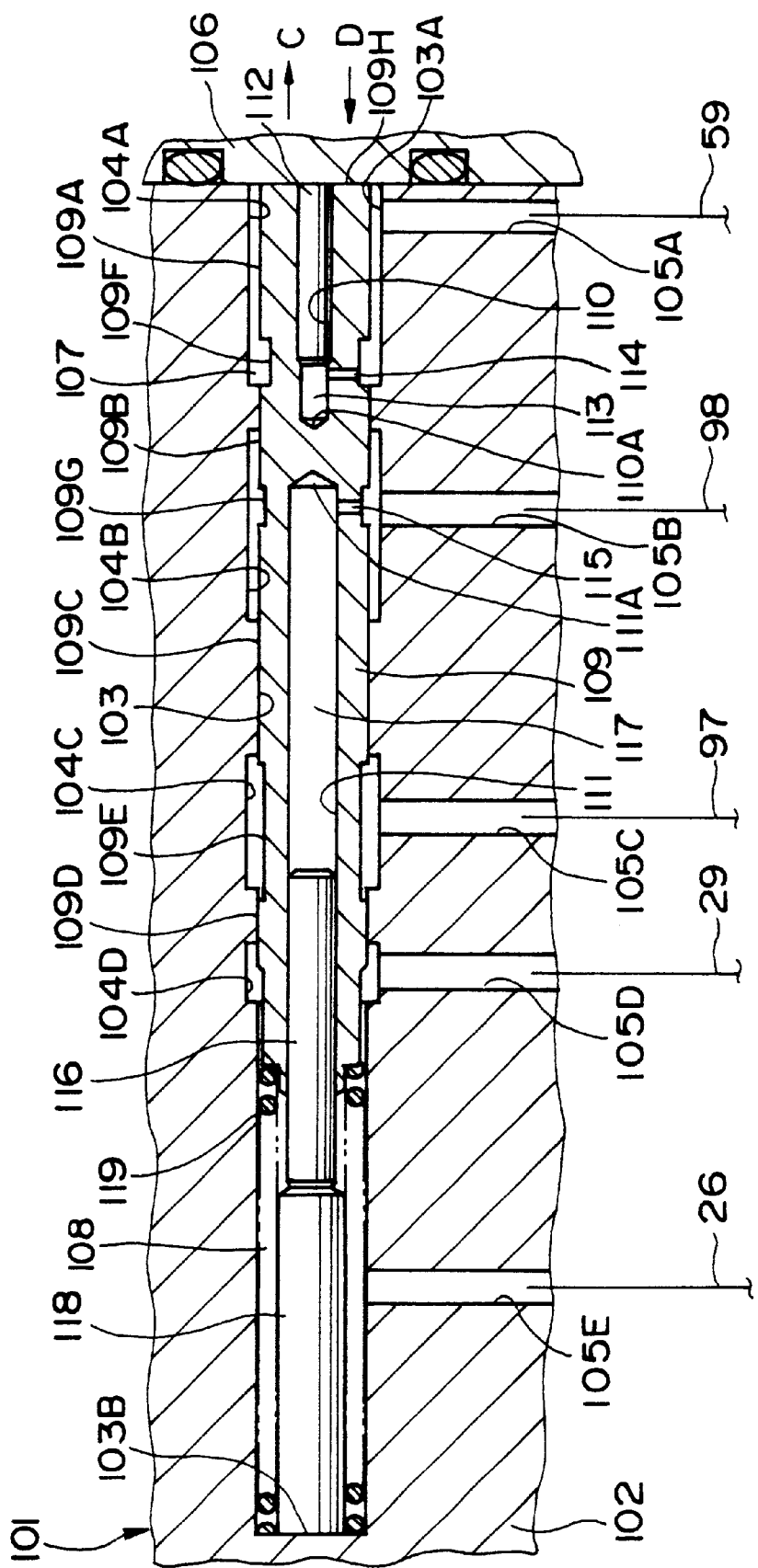
FIG. 14 is a longitudinal sectional view showing a state in which the volume control valve illustrated in FIG. 13 is in a large volume position.
Figure 15:
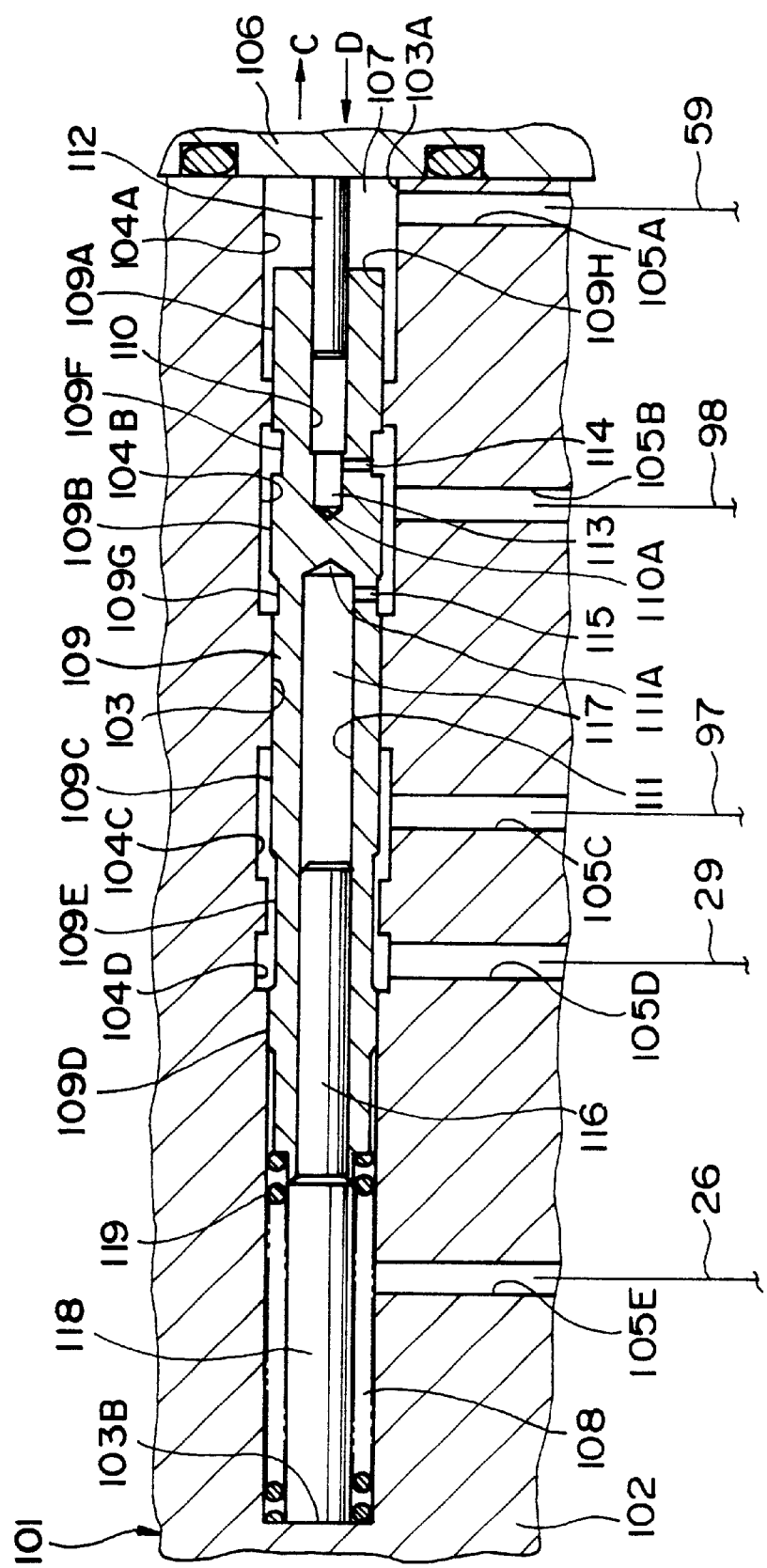
FIG. 15 is a longitudinal sectional view of the volume control valve, showing a state in which a spool has slid up to a stroke end thereof and switched to a small volume position.

Referring now to FIGS. 13 to 15, there is illustrated a fifth embodiment of the present invention, in which the same components as in the fourth embodiment are identified by the same reference numerals as in the fourth embodiment and explanations thereof will be omitted.

According to characteristic features of this fifth embodiment, an oil chamber and a pressure receiving chamber are formed within a spool so that both chambers are opposed to each other, the oil chamber is selectively established and blocked communication with a pilot port and an external command pressure port, while the pressure receiving chamber is constantly communicated with the pilot port to receive a pilot pressure, and when the pilot pressure is introduced into the oil chamber, the pilot pressure is exerted on the oil chamber and the pressure receiving chamber in directions opposite to each other, thereby causing the pilot pressure receiving area of the spool to be varied.

In the figures, indicated at 101 is a volume control valve adopted in this embodiment. As shown in FIG. 14, the volume control valve 101 is composed of a valve housing 102, a spool 109 and a piston 112 to be described later. The volume control valve 101 is constructed in substantially the same manner as the volume control valve 81 described in the fourth embodiment and is selectively controlled between the large volume position (a) and the small volume position (b) with both external command pressure fed from the command pressure conduit 59 and pilot pressure P fed from the pilot conduit 98.

In the valve housing 102 of the volume control valve 101 is formed a stepped, spool sliding bore 103 having an open end 103A on one end thereof and a closed end 103B on the opposite end. The spool sliding bore 103 is circumferentially formed with annular oil grooves 104A, 104B, 104C, and 104D in axially spaced positions.

Likewise, in the valve housing 102 are formed an external command pressure port 105A, a pilot port 105B, a high pressure port 105C, a pressure oil/discharge port 105D, and a tank port 105E in axially spaced positions. The ports 105A to 105D communicate with the interior of the spool sliding bore 103 through the oil grooves 104A to 104D.

The reference numeral 106 denotes a lid member which closes the open end 103A side of the spool sliding bore 103. The lid member 106, which constitutes a part of the valve housing 102, defines an external command pressure chamber 107 between it and one end side of the spool 109 to be described later so that the chamber 107 is positioned within the oil groove 104A.

The reference numeral 108 denotes a spring chamber formed between the closed end 103B of the spool sliding bore 103 and the end face at the opposite end of the spool 109. Within the spring chamber 108 are disposed a return spring 119 and a stopper 118 both to be described later. The spring chamber 108 is constantly connected to the tank 2 through the tank port 105E and the tank conduit 26.

The reference numeral 109 denotes a spool inserted into the spool sliding bore 103 of the valve housing 102. As shown in FIGS. 14 and 15, the spool 109 is circumferentially formed with lands 109A, 109B, 109C, and 109D in axially spaced positions. Between the lands 109C and 109D of the spool 109 is formed an annular groove 109E which establishes and blocks communication between the oil grooves 104C and 104D. Through the annular groove 109E and the land 109D the spool 109 selectively establishes and blocks communication of the pressure oil feed/discharge port 105D with the high pressure port 105C and the tank port 105E.

Also, the spool 109 is circumferentially formed with narrow, annular grooves 109F between the lands 109A and 109B. Between the lands 109B and 109C is formed another annular groove 109G so as to be positioned on an open end side of an oil hole 115 which will be described later. The annular groove 109F is positioned on an open end side of an oil hole 114 which will be described later and, substantially with zero lap, it establishes and blocks communication of an oil chamber 113 to be described later with the external command pressure port 105A and the pilot port 105B. Therefore, the width of the annular groove 109F is set at a value almost equal to the spaced distance between the oil grooves 104A and 104B.

Further, the end face at one end of the spool 109 located on the land 109A side serves as a command pressure receiving portion 109H for receiving an external command pressure. The command pressure receiving portion 109H receives the external command pressure in the external command pressure chamber 107 at the pressure receiving area S3 of Expression 8.

Indicated at 110 is an axial bore formed in the spool 109 and extending axially of the spool. One end of the axial bore 110 is open to an end face of the spool 109, while the opposite end thereof is closed as a bottom portion. Almost similarly to the axial bore 90 described in the fourth embodiment, the bottom portion of the axial bore 110 serves as a second pressure receiving portion 110A which receives the internal pressure of the oil chamber 113 at a relatively small pressure receiving area S4.

Indicated at 111 is a bottomed bore formed axially of the spool 109 so as to be positioned on the opposite side to the axial bore 110. One end of the bottomed hole 111 is closed as a bottom portion, while the opposite end thereof is open to an end face of the spool 109. Axially of the spool 109 the bottomed bore 111 is opposed to the axial bore 110 at a predetermined spacing, and the bottomed bore 111 is formed to have a larger diameter than the diameter of the axial bore 110. The bottom portion of the bottomed bore 111 constitutes a first pressure receiving portion 111A which receives the pilot pressure P constantly. The pressure receiving portion 111A has a larger pressure receiving area S6 (S6>S4) than the pressure receiving portion 110A within a pressure receiving chamber 117 which will be described later.

Indicated at 112 is a piston inserted slidably into the axial bore 110. The piston 112 closes the open end of the axial bore 110 at all times and one end thereof is in abutment against a surface of the lid member 106. The opposite end side of the piston 112 defines the oil chamber 113 between it and the bottom portion of the axial bore 110.

Indicated at 114 is an oil hole formed radially in the spool 109 so as to be positioned in the oil chamber 113. The oil hole 114 is open to an outer peripheral surface of the spool 109 at the position of the annular groove 109F. The oil hole 114 and the annular groove 109F constitute an oil passage which, according to a slide position of the spool 109, selectively establishes and blocks communication of the oil chamber 113 with the external command pressure port 105A (oil groove 104A) and the pilot port 105B (oil groove 104B).

Further, the oil hole 114 constitutes a throttle passage formed to have a smaller diameter than the oil hole 115 which will be described later. When the oil chamber 113 is brought into communication with the external command pressure port 105A, as shown in FIG. 14, the oil hole 114 functions to prevent the pressure oil in the oil chamber 113 from jetting toward the external command pressure port 105A which is lower in pressure, thereby preventing the development of a surge pressure on the port 105A side.

Indicated at 115 is an oil hole formed radially in the spool 109 so as to be positioned in the pressure receiving chamber 117. The oil hole 115 is open to the outer peripheral surface of the spool 109 at the position of the annular groove 109G and causes the pressure receiving chamber 117 to communicate with the pilot port 105B (oil groove 104B) constantly. With the pilot pressure P introduced from the pilot port 105B, the pressure receiving chamber 117 produces, in the arrow C direction of the spool 109, a pushing force F6 based on Expression 17 which will be described later.

Indicated at 116 is a piston member inserted slidably into the bottomed bore 111 and having a large diameter. The piston member 116 closes the open end of the bottomed bore 111 constantly, and one end thereof defines the pressure receiving chamber 117 between it and the bottom portion of the bottomed bore 111. The opposite end of the piston member 116 projects from the bottomed bore 111 and this projecting end is constantly abutted against a stopper 118 to receive a hydraulic reaction force induced within the oil receiving chamber 117.

Indicated at 118 is a stopper provided within the valve housing 102 so as to be positioned on the closed end 103B side of the spool sliding bore 103. The stopper 118 is formed by a cylindrical rod or the like and projects from the closed end 103B of the spool sliding bore 103 toward the interior of the spring chamber 108. One end of the stopper 118 is in abutment against an end face of the piston member 116 and comes into abutment against an end face of the spool 109 when the spool is put in sliding displacement as in FIG. 15, to delimit the stroke end of the spool 109.

Indicated at 119 is a return spring disposed within the spring chamber 108 and positioned between the valve housing 102 and the spool 109 and constituting a biasing means. One end of the return spring 119 is secured to an end portion of the spool 109 by fitting or any other suitable means, while the opposite end thereof is fitted on an outer periphery of the stopper 118 and is abutted against the closed end 103B of the spool sliding bore 103. With a biasing force Fd, the return spring 119 urges the spool 109 in the direction of arrow C constantly, whereby the volume control valve 101 is held in the large volume position (a) shown in FIG. 13.

Also according to this fifth embodiment there can be obtained substantially the same functions and effects as in the fourth embodiment. In this fifth embodiment, however, the axial bore 110 and the bottomed bore 111 both extending axially are formed respectively on one end side and the opposite end side of the spool 109, the pressure receiving portion 110A having a small pressure receiving area S4 and the oil chamber 113 are formed within the axial bore 110 by the piston 112, and within the bottomed bore 111 are formed the pressure receiving portion 111A having a pressure receiving area S6 and the pressure receiving chamber 117 by means of the piston member 116 having a large diameter.

In this embodiment, moreover, the pilot pressure P from the pilot port 105B is introduced constantly into the pressure receiving chamber 117 formed within the spool 109, thereby allowing the following pushing force F6 to be developed in the arrow C direction of the spool 109 by the pressure receiving portion 111A.

$$F6=S6\times P \qquad (17)$$

The oil chamber 113 is brought into communication with the external command pressure port 105A and the pilot port 105B selectively according to a slide position of the spool 109. While the oil chamber 113 is in communication with the external command pressure port 105A, the pressure receiving portion 110A receives the external command pressure in the external command pressure chamber 107 in conjunction with the pressure receiving portion 109H.

On the other hand, when the oil chamber 113 comes into communication with the pilot port 105B according to a sliding displacement of the spool 109, as shown in FIG. 15, the pilot pressure P is introduced into the oil chamber 113, so that the pressure receiving portion 110A causes the pushing force F4 (F4=S4×P) based on Expression 13 and acting in the direction of arrow D to be developed for the spool 109.

That is, when the spool 109 is put in sliding displacement up to the stroke end shown in FIG. 15 with the external command pressure to switch the position of the volume control valve 101 to the small volume position (b), the spool 109 undergoes the pushing force F6 in the arrow C direction and further undergoes the pushing force F4 (F4<F6) in the arrow D direction.

Consequently, in the state shown in FIG. 15, the spool 109 causes the following pushing force F7 to be developed in the arrow C direction and at this time the pressure receiving area of the spool 109 is diminished to the area of (S6–S4).

$$F7=F6-F4=(S6-S4)\times P \qquad (18)$$

Besides, the biasing force Fd of the return spring 119 acts on the spool 109 in the arrow C direction and the pushing force F3 of the external command pressure based on Expression 9 acts on the spool 109 in the arrow D direction, therefore, as long as the following relationship is satisfied, the spool 109 is put in sliding displacement up to the stoke end shown in FIG. 15 with the external command pressure of the pressure value Pg and the volume control valve 101 is held in the small volume position (b).

$$F3<F7+Fd \qquad (19)$$

In this state, however, if the pilot pressure P rises to a level above the pressure P1 shown in FIG. 5, the pushing force F7 of the spool 109 based on Expression 18 and acting in the arrow C direction increases, so when the following relationship is satisfied:

$$F3<F7+Fd \text{ provided } P\geq P1 \qquad (20)$$

the spool 109 slides in the arrow C direction against the internal pressure of the external command pressure chamber 107 and returns to the initial position shown in FIG. 14. As a result, the volume control valve 101 returns to the large volume position (a) shown in FIG. 13.

In this state, the oil chamber 113 formed within the spool 109 communicates with the external command pressure port 105A through the oil hole 114 and an external command pressure (say, P/10 or so) lower than the pilot pressure P is introduced into the oil chamber 113. Since this external command pressure is sufficiently low in comparison with the pilot pressure P, the spool 109 does not substantially receive the pilot pressure P on the oil chamber 113, but continues to receive the pilot pressure P on the pressure receiving chamber 117. As a result, the pressure receiving area of the spool 109 for the pilot pressure P becomes equal to the pressure receiving area S6 of the pressure receiving chamber 117 and thus increases substantially.

Therefore, even in the case where the motor drive pressure decreases slightly as the motor volume of the hydraulic motor 3 changes from small to large volume, the volume control valve 101 can be held in the large volume position (a) and thus the motor volume can be held at a large volume until the motor drive pressure (pilot pressure P) again drops to a level below the pressure P2, whereby the hysteresis characteristic shown in FIG. 5 can be obtained also in this embodiment.

In this embodiment, moreover, since the oil receiving chamber 117 is formed within the spool 109 by the bottomed hole 111, it is not necessary to specially form a pilot pressure receiving portion on the outer periphery of the spool 109 and it is possible to reduce the outside diameter of the spool 109.

Figure 16:
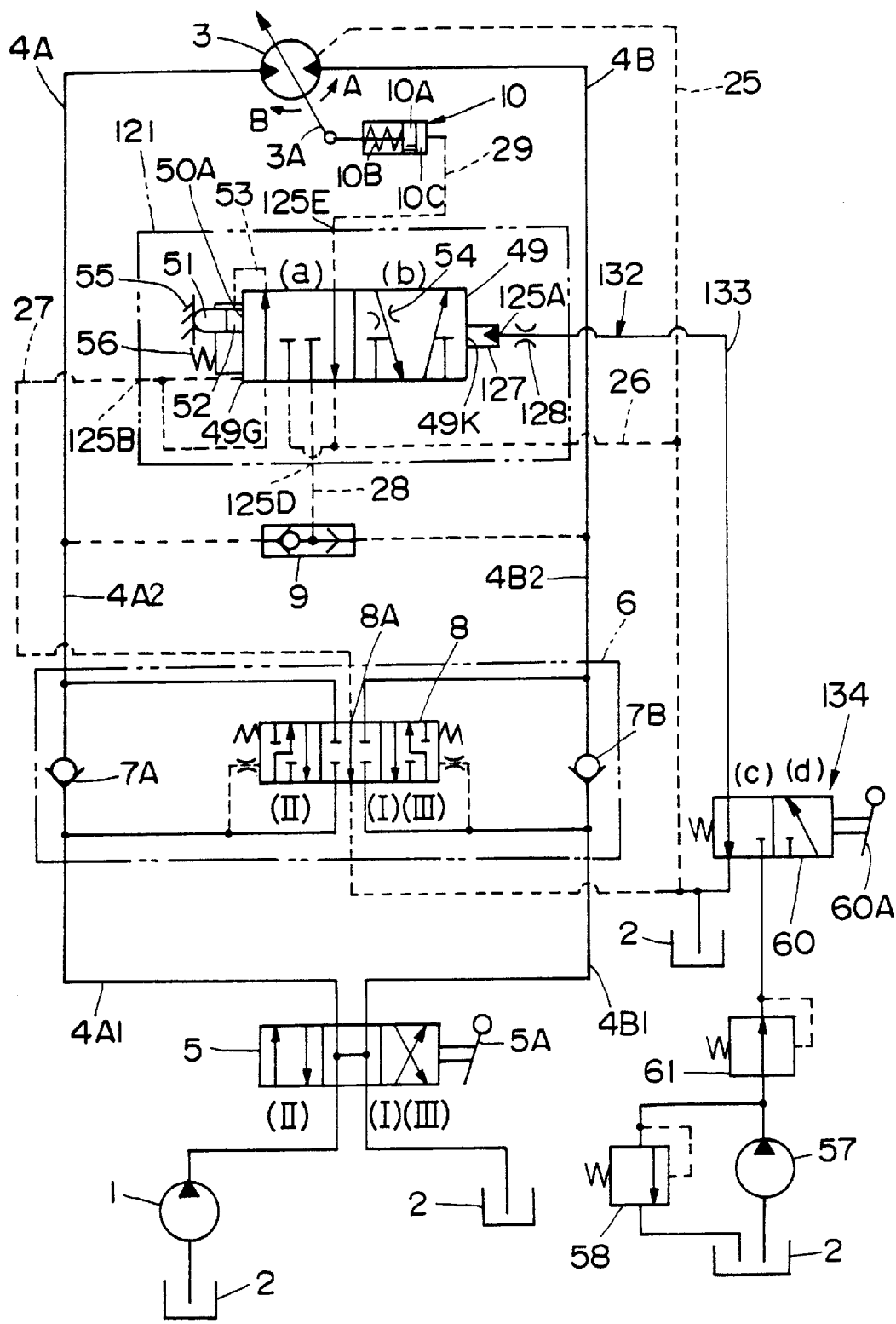
FIG. 16 is a hydraulic circuit diagram for traveling of a hydraulic excavator to which a volume control valve according to a sixth embodiment of the present invention is applied.
Figure 17:
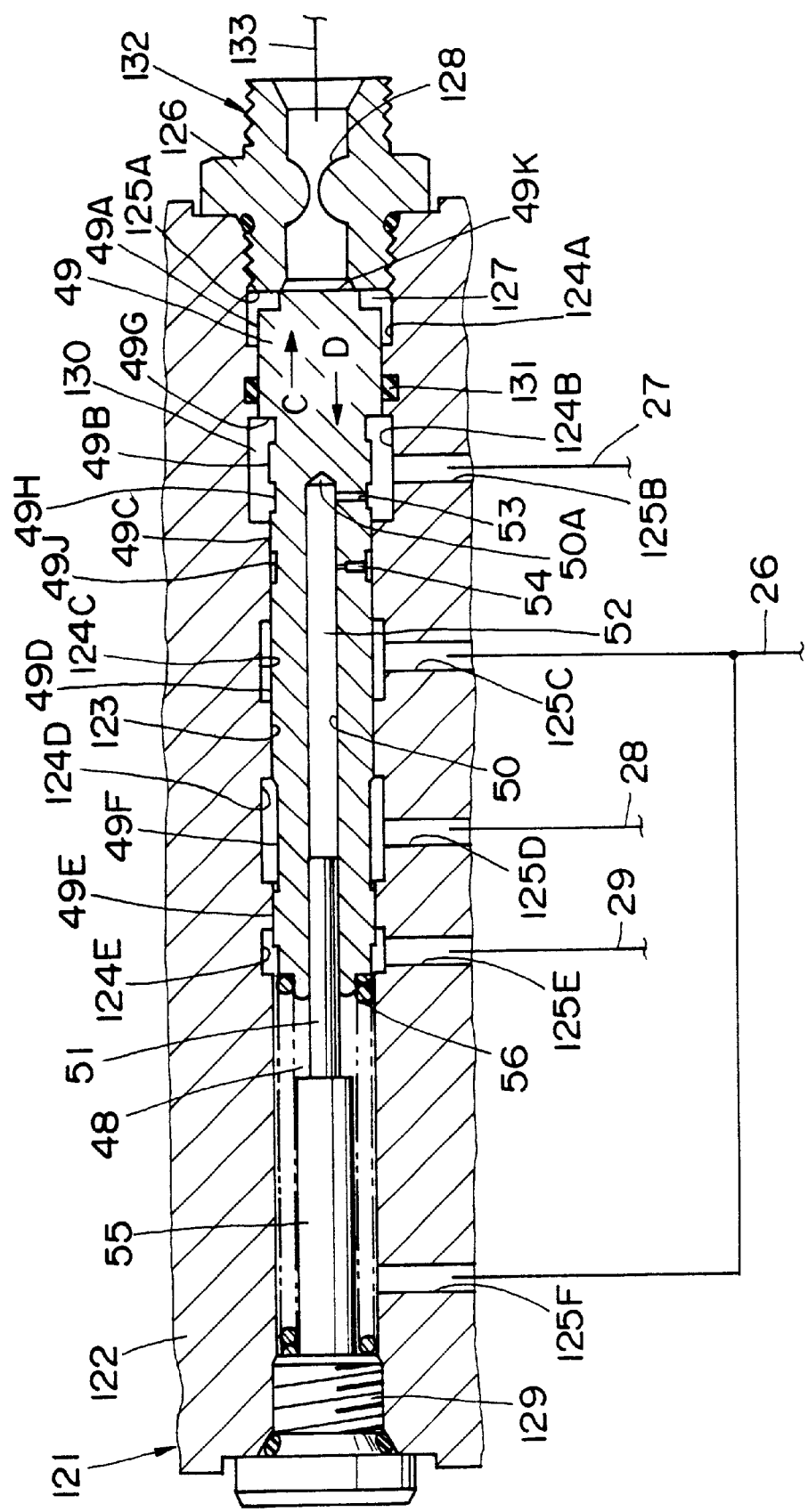
FIG. 17 is a longitudinal sectional view showing a state in which the volume control valve illustrated in FIG. 16 is in a large volume position.
Figure 18:
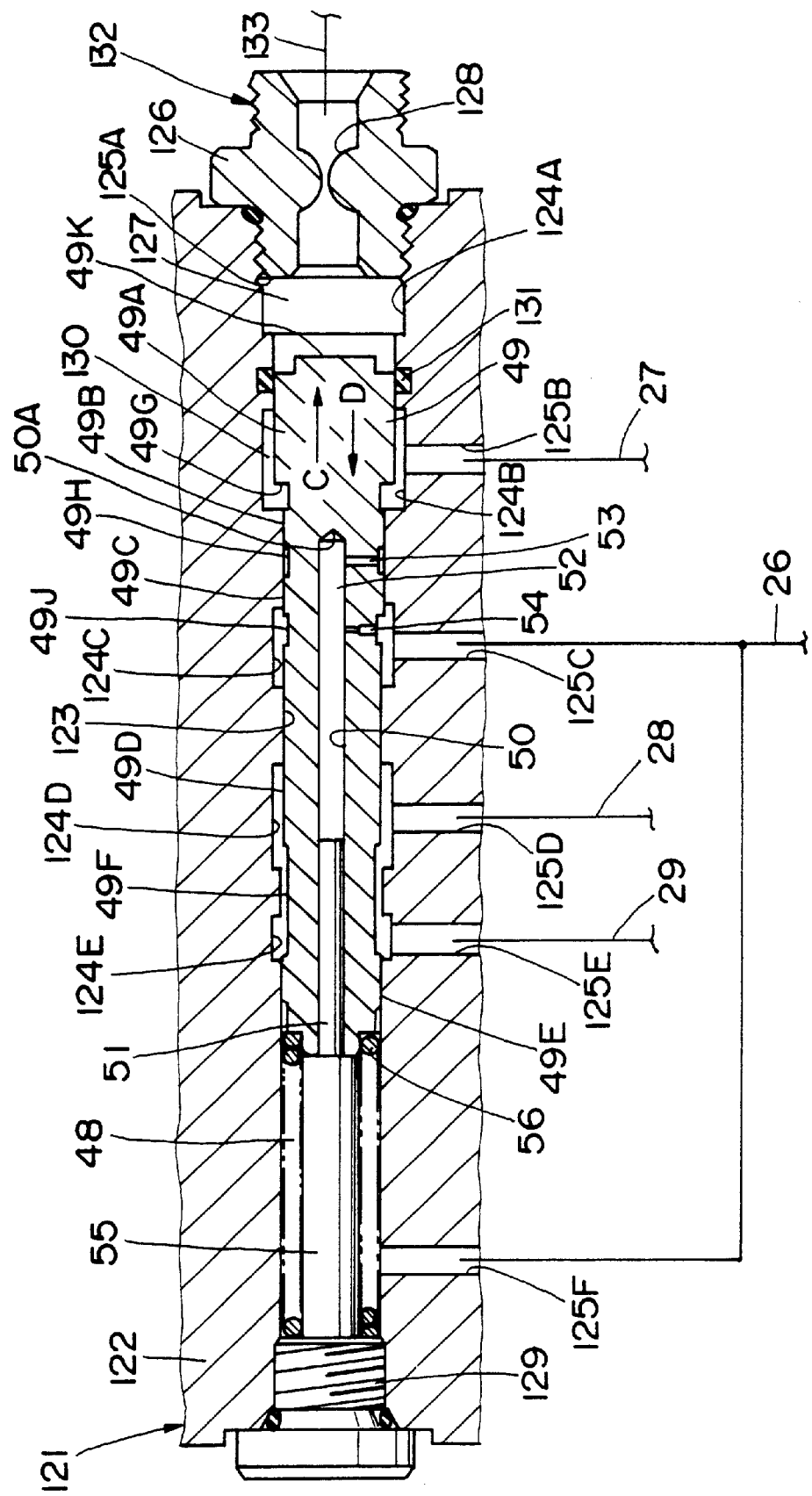
FIG. 18 is a longitudinal sectional view of the volume control valve, showing a state in which a spool has slid up to a stroke end thereof and switched to a small volume position.

Referring now to FIGS. 16 to 18, there is illustrated a sixth embodiment of the present invention. This sixth embodiment is characteristic in that a throttle is provided halfway of a command pressure conduit which connects an external command pressure port of a volume control valve to a command pressure supply means provided as an external means. In this sixth embodiment the same components as in the second embodiment are identified by the same reference numerals as in the second embodiment and explanations thereof will be omitted.

In those figures, the reference numeral 121 denotes a volume control valve adopted in this embodiment. Almost similarly to the volume control valve 41 described in the second embodiment, the volume control valve 121 is composed of a valve housing 122, spool 49, piston 51, stopper 55, and return spring 56. In accordance with an external command pressure provided from an external pressure conduit 132 to be described later and the pilot pressure P from the pilot conduit 27 the volume control valve 121 is selectively controlled between the large volume position (a) and the small volume position (b).

However, as shown in FIG. 17, the valve housing 122 of the volume control valve 121 according to this embodiment has a different shape. In the valve housing 122, one end of a spool sliding bore 123 is open axially as an external command pressure port 125A which will be described later. An adapter 126 to be described later is threadedly engaged with the valve housing 122 on the external command pressure port 125A side. Likewise, a plug 129 to be described later is threadedly engaged with the valve housing 122 on the opposite end of the spool sliding bore 123 to close the said opposite end.

In the valve housing 122 of the volume control valve 121, the spool sliding bore 123 is circumferentially formed with annular oil grooves 124A, 124B, 124C, 124D, and 124E in axially spaced positions between the adapter 126 and the plug 129. Further, an external command pressure port 125A, a pilot port 125B, tank ports 125C and 125F, a high pressure port 125D, and a pressure oil feed/discharge port 125E are formed in the valve housing 122 in axially spaced positions.

Of the ports 125A to 125F, the external command pressure port 125A is positioned on one end of the spool sliding bore 123 and is substantially coaxial with the spool sliding bore.

The pilot port 125B, tank ports 125C, 125F, high pressure port 125D, and pressure oil feed/discharge port 125E extend radially of the spool sliding bore 123 and communicate with the interior of the spool sliding bore 123 through the oil grooves 124B to 124E.

Indicated at 126 is a stepped cylindrical adapter which is threadedly engaged with the external command pressure port 125A on one end of the spool sliding bore 123. Together with a piping 133 to be described later, the adapter 126 constitutes a command pressure conduit 132. The adapter 126 serves as a pipe joint for connecting the piping 133 to the external command pressure port 125A. The adapter 126 is positioned within the oil groove 124A formed in the valve housing 122 and defines an external command pressure chamber 127 between it and the command pressure receiving portion 49K of the spool 49.

Indicated at 128 is a throttle formed on an inner periphery of the adapter 126. The throttle 128 functions to diminish the flow path area in the adapter 126 and exert a throttling action on an external command pressure which is fed to and discharged from the external command pressure chamber 127 through the adapter 126.

When the spool 49 of the volume control valve 121 slides, for example, in the direction of arrow C from its position shown in FIG. 18, pressure oil (external command pressure) flowing out from the external command pressure chamber 127 to the piping 133 is throttled by the throttle 128. Consequently, the external command pressure chamber 127 functions as a damper chamber and prevents the spool 49 shown in FIG. 18 from sliding in the arrow C direction at a high speed.

Indicated at 129 is a plug engaged threadedly with the opposite end of the spool sliding bore 123. The plug 129 constitutes a part of the valve housing 122 and closes the spool sliding bore 123 at a position opposite to the adapter 126. As is the case with the second embodiment, the plug 129 defines the spring chamber 48 between it and the end face at the opposite end of the spool 49, with return spring 56 and stopper 55 being disposed within the spring chamber 48.

Indicated at 130 is a pilot pressure receiving chamber defined between the spool sliding bore 123 and the spool 49 so as to be positioned within the oil groove 124B. The pilot pressure receiving chamber 130 is in communication with the pilot port 125B constantly, allowing the pilot pressure from the pilot conduit 27 to be received by the first pressure receiving portion 49G of the spool 49, whereby the spool 49 undergoes a pushing force in the arrow C direction.

Indicated at 131 is a seal member which provides a seal between the external command pressure chamber 127 and the pilot pressure receiving chamber 130. The seal member 131 is mounted to the circumferential wall of the spool sliding bore 123 in a position between the oil grooves 124A and 124B of the valve housing 122 and is in sliding contact with the outer periphery of the land 49A of the spool 49.

Since the seal member 131 is provided between the valve housing 122 and the spool 49, it provides a liquid-tight seal between the pilot port 125B and the external command pressure chamber 127 and, for example, it prevents the leakage of pressure oil (pilot pressure) into the external command pressure chamber 127 which pilot pressure is fed from the pilot port 125B into the pilot pressure receiving chamber 130.

Next, the reference numeral 132 denotes a command pressure conduit connected to the external command pressure port 125A of the volume control valve 121. The command pressure conduit 132 is composed of the adapter 126 and the piping 133 which is constituted by a hydraulic hose or the like. One end portion of the piping 133 is connected to the external command pressure port 125A of the volume control valve 121 through the adapter 126, while the opposite end portion thereof is connected to the pressure selector valve 60, as shown in FIG. 16.

The numeral 134 denotes a command pressure supply unit as an external command pressure supply means. The command pressure supply unit 134 is composed of such pilot pump 57, pressure selector valve 60, pressure reducing valve 61, and tank 2 as have been described in the second embodiment. When the operator of the hydraulic excavator operates the operating lever 60A manually to switch the position of the pressure selector valve 60 to either the fixed volume position (c) or the automatic switching position (d), the command pressure supply unit 134 generates an external command pressure within the command pressure conduit 132.

Also according to this embodiment constructed as above there can be obtained the same functions and effects as in the second embodiment, but particularly in this sixth embodiment, since the throttle 128 is provided, for example, within the adapter 126 at a position halfway of the command pressure conduit 132 which connects the external command pressure chamber 127 in the volume control valve 121 to the pressure selector valve 60, it is possible to obtain the following functions and effects.

For example, with the position of the pressure selector valve 60 shown in FIG. 16 switched from the fixed volume position (c) to the automatic switching position (d), if the position of the directional control valve 5 is switched from the neutral position (I) to the drive position (II) or (III) and the hydraulic motor 3 is started, the motor drive pressure (load pressure) may vary instantaneously.

With the volume control valve 121 held in the small volume position (b), if the load pressure varies instantaneously, the load pressure is fed as a pilot pressure also into the pilot pressure receiving chamber 130 from the pilot port 125B, thus resulting in that the internal pressure of the pilot pressure receiving chamber 130 also varies (rises) in an instant.

Consequently, as shown in FIG. 18, the pressure receiving portion 49G of the spool 49, which is in the small volume position, undergoes a pushing force in the arrow C direction due to the pressure fluctuation in the pilot pressure receiving chamber 130 and tries to slide in the same direction.

In this case, however, the spool 49 tends to move in a direction to diminish the external command pressure chamber 127 and hence the pressure oil (external command pressure) in the external command pressure chamber 127 flows out to the piping 133 through the throttle 128 of the adapter 126, so that the flow rate of the outgoing oil can be limited to a small value by the throttle 128, that is, the internal pressure of the external command pressure chamber 127 can be increased.

Thus, the external command pressure chamber 127 functions as a damper chamber, making it possible to prevent the spool 49 from instantaneous sliding in the arrow C direction and prevent the occurrence of a hunching phenomenon of the spool 49 caused by an instantaneous fluctuation of the load pressure. For example, therefore, it is possible to prevent the volume control valve 121 from being switched from the small volume position (b) to the large volume position (c) due to an instantaneous fluctuation of pressure. In this way it is possible to stabilize the selective control of the volume control valve 121.

Besides, since the seal member 131 for sealing the external command pressure chamber 127 in a liquid-tight manner relative to the pilot pressure receiving chamber 130 is disposed between the valve housing 122 and the spool 49, it is possible to cut off communication between the external command pressure chamber 127 and the pilot pressure receiving chamber 130 and hence possible to prevent the leakage of a high pressure oil (pilot pressure) into the external pressure command chamber 127 which high pressure oil is fed from the pilot port 125B into the pilot pressure receiving chamber 130.

Consequently, it is possible to prevent the leakage of pressure from the pilot pressure receiving chamber 130 toward the external command pressure chamber 127 and thereby prevent "confined pressure" from being developed in the external command pressure chamber 127 by such leak pressure. Thus, without the need of giving any special consideration to the development of "confined pressure," it is possible to set a desired flow path area of the throttle 128 and hence possible to enhance the design freedom.

Further, since the adapter 126 as a pipe joint which constitutes a part of the command pressure conduit 132 is provided on the external command pressure port 125A of the valve housing 122 and the throttle 128 is provided on the inner periphery of the adapter 126, the throttle 128 for allowing the external command pressure chamber 127 to function as a damper chamber can be incorporated in the adapter 126 and it is no longer necessary to separately provide a throttle halfway of the piping 133 that constitutes the command pressure conduit 132, thus making it possible to simplify the piping work and improve the working efficiency.

Although in the sixth embodiment the throttle 128 is provided on the inner periphery of the adapter 126 which constitutes a part of the command pressure conduit 132, this constitutes no limitation in the present invention. For example, a throttle may be provided halfway of the piping 133 which constitutes the command pressure conduit 132. Also in the second to fifth embodiments a throttle may be provided halfway of the command pressure conduit 59 and the external command pressure chamber 47 (87, 107) may be allowed to function as a damper chamber.

In the second to sixth embodiments the volume control valve 41 (71, 81, 101, 121) is selectively controlled with the external command pressure. But also in these embodiments, for example as described in the first embodiment, there may be adopted a construction wherein the motor volume is controlled by a self-pressure control method in accordance with only the motor drive pressure (pilot pressure).

In the fourth and fifth embodiments, pressure oil selected by the shuttle valve 9 is fed to the high pressure port 85D (105C) and pilot port 85B (105B) in the volume control valve 81 (101) through the high pressure conduit 97 and the pilot conduit 98. But also in the fourth and fifth embodiments, for example as described in the second embodiment, there may be adopted a construction wherein the load pressure (motor drive pressure) of the hydraulic motor 3 is fed to the pilot port 85B (105B) of the volume control valve 81 (101), using the counterbalance valve 6 or the like.

In the fourth and fifth embodiments it is not always necessary to introduce pressure from the pilot port 85B (105B) into the oil chamber 92 (113) formed in the volume control valve 81 (101). For example, there may be adopted a construction wherein the pressure from the high pressure port 85D (105C) is conducted as a pilot pressure into the oil chamber 92. This point is also true of the other embodiments.

Although in the second embodiment pressure oil from the shuttle valve 9 is conducted to the high pressure port 45D of the volume control valve 41, this constitutes no limitation in the present invention. For example, pressure oil from the pilot pump 57 may be conducted to the high pressure port 45D. This point is also the case with the other embodiments.

Further, although in the above embodiments the hydraulic motor 3 for traveling is used as a variable displacement type hydraulic rotary machine, the present invention is not limited thereto, but is also applicable to, for example, a hydraulic motor for rotational drive or for winching rope. The invention is further applicable widely to volume control valves for variable displacement type hydraulic rotary machines such as hydraulic pumps which serve as oil pressure sources for hydraulic excavators and hydraulic cranes.

INDUSTRIAL APPLICABILITY

According to the present invention, as set forth above, a first pressure receiving portion for receiving the pilot pressure from the pilot port is provided in the spool, a bottomed axial bore is formed axially of the spool, an oil chamber is defined within the axial bore by the piston and a second pressure receiving portion is provided within the oil chamber, and through an oil passage formed in the spool at the position of the oil chamber, said oil chamber is established and blocked communication with ports different in pressure according to a sliding displacement of the spool. With this construction, the pilot pressure receiving area of the spool can be varied by the first and second pressure receiving portions between the time when the oil chamber comes into communication with the pilot port and the time when it comes into communication with the tank port, and by this change of the pressure receiving area it is made possible to impart a hysteresis characteristic to the switching pressure of the volume control valve. Besides, it is possible to reduce the number of components of the volume control valve, improve the assembling work efficiency, attain a compact shape as a whole, that is, attain the reduction of size, and perform the volume control in an automatic and stable manner.

According to the present invention, moreover, since the spool inserted into the spool sliding bore in the valve housing is put in an axial sliding displacement by both pilot pressure provided from the pilot port and external command pressure provided from the external command pressure port, not only a fixed volume control and an automatic volume switching control can be done selectively using the external command pressure, but also the automatic volume switching control, when executed, can be given a hysteresis characteristic for the pilot pressure. Also in this case, not only it is possible to reduce the number of components of the volume control valve and thereby improve the assembling work efficiency, but also it is possible to attain a compact shape as a whole, that is, attain the reduction of size and perform the volume control automatically in a stable manner.

What is claimed is:

1. A volume control valve for a variable displacement type hydraulic rotary machine constructed such that, for controlling the volume of the variable displacement type hydraulic rotary machine by an actuator of variable volume, a load pressure of the variable displacement type hydraulic rotary machine is received as a pilot pressure to switch oil pressure to be fed to the actuator from one pressure level to another, said volume control valve comprising:

a valve housing provided with a spool sliding bore, and formed with a high pressure port, a tank port connected to a tank, a pilot port for receiving said load pressure of said variable displacement type hydraulic rotary machine as a pilot pressure, and a pressure oil feed/ discharge port for feeding oil pressure to and from said actuator of variable volume, at spaced positions in the axial direction of said spool sliding bore;

a spool inserted into said spool sliding bore of said valve housing and adapted to slide axially through said spool sliding bore to selectively establish and block communication of said pressure oil feed/discharge port with said high pressure port and said tank port;

a first pressure receiving portion formed in said spool to receive said load pressure as a pilot pressure introduced from said pilot port, for displacing the spool axially within said spool sliding bore;

a bottomed axial bore formed in said spool, said axial bore extending in the axial direction of the spool and being open to an end face of the spool;

a piston inserted slidably into said axial bore so as to close the open end of said axial bore, said piston defining an oil chamber between it and a bottom of the axial bore and receiving a hydraulic reaction force induced within said oil chamber;

a second pressure receiving portion formed by the bottom of said axial bore and adapted to receive an internal pressure of said oil chamber, thereby changing a total pressure receiving area of said spool in conjunction with said first pressure receiving portion; and an oil passage formed in said spool at a position corresponding to said oil chamber, said oil passage causing the oil chamber to come into communication selectively with ports different in pressure out of said ports when the spool is put in a sliding displacement within said spool sliding bore.

2. A volume control valve for a variable displacement type hydraulic rotary machine according to claim 1, wherein a biasing means is disposed between said valve housing and said spool to urge the spool constantly in a direction opposite to the pilot pressure receiving direction of said first pressure receiving portion.

3. A volume control valve for a variable displacement type hydraulic rotary machine according to claim 1, wherein said oil passage causes said oil chamber to establish and block communication selectively with said pilot port and said tank port in accordance with a slide position of said spool, and when the oil chamber communicates with the pilot port through the oil passage, the spool receives the pilot pressure at a large pressure receiving area on both said first and second pressure receiving portion sides, while when the oil chamber communicates with the tank port through the oil passage, the spool receives the pilot pressure at a small pressure receiving area on the first pressure receiving portion side.

4. A volume control valve for a variable displacement type hydraulic rotary machine according to claim 3, wherein when said oil chamber is communicated with said pilot port, said oil passage causes the oil chamber to block communication with the other port almost simultaneously, and when the oil chamber is communicated with the other port, the oil passage causes the oil chamber to block communication with the pilot port almost simultaneously.

5. A volume control valve for a variable displacement type hydraulic rotary machine according to claim 1, wherein said spool is constituted by a stepped spool whose one end side is larger in diameter than the other portion thereof, and the first pressure receiving portion is formed by a stepped outer periphery portion of the spool which is positioned on the larger-diameter side of the spool.

6. A volume control valve for a variable displacement type hydraulic rotary machine according to claim 1, wherein said spool has a plurality of lands for blocking communication between said ports different in pressure, and said oil passage has a throttle passage at a position where said oil chamber is brought into and out of communication with a port lower in pressure than the pilot port out of said ports.

7. A volume control valve for a variable displacement type hydraulic rotary machine constructed such that, for controlling the volume of the variable displacement type hydraulic rotary machine by an actuator of variable volume, a load pressure of the variable displacement type hydraulic rotary machine is received as a pilot pressure to switch oil pressure to be fed to the actuator from one pressure level to another, said volume control valve comprising:

a valve housing provided with a spool sliding bore, and formed with a high pressure port, a tank port connected to a tank, a pilot port for receiving said load pressure of said variable displacement type hydraulic rotary machine as a pilot pressure, an external command pressure port connected to an external command pressure supply means, and a pressure oil feed/discharge port for feeding oil pressure to and from said actuator of variable volume, at spaced positions in the axial direction of said spool sliding bore;

a spool inserted into said spool sliding bore of said valve housing adapted to slide axially through said spool sliding bore to selectively establish and block communication of said pressure oil feed/discharge port with said high pressure port and said tank port;

a command pressure receiving portion formed in said spool to receive an external command pressure introduced from said external command pressure port, for displacing the spool in the axial direction;

a first pressure receiving portion formed in said spool so as to be axially opposed to said command pressure receiving portion and adapted to receive said load pressure as a pilot pressure introduced from the pilot port, for displacing the spool in a direction reverse to the command pressure receiving portion;

a bottomed axial bore formed in said spool, said axial bore extending in the axial direction of the spool and being open to an end face of the spool;

a piston inserted slidably into said axial bore so as to close the open end of said axial bore, said piston defining an oil chamber between it and a bottom of the axial bore and receiving a hydraulic reaction force induced within said oil chamber;

a second pressure receiving portion formed by the bottom of said axial bore and adapted to receive an internal pressure of said oil chamber, thereby changing a total pressure receiving area of said spool in conjunction with said first pressure receiving portion; and an oil passage formed in said spool at a position corresponding to said oil chamber, said oil passage causing the oil chamber to come into communication selectively with ports different in pressure out of said ports when the spool is put in a sliding displacement within said spool sliding bore.

8. A volume control valve for a variable displacement type hydraulic rotary machine according to claim 7, wherein said command pressure receiving portion is formed by the end face at one end of said spool.

9. A volume control valve for a variable displacement type hydraulic rotary machine according to claim 7, wherein a biasing means is disposed between said valve housing and said spool to urge the spool constantly in a direction opposite to the external command pressure receiving direction of said external command pressure receiving portion.

10. A volume control valve for a variable displacement type hydraulic rotary machine according to claim 7, wherein an external command pressure chamber communicating with said external command pressure port is defined between said command pressure receiving portion and said valve housing, and a throttle for generating a damper action in said external command pressure chamber is provided in a command pressure conduit which connects the external command pressure port to an external command pressure supply means.

11. A volume control valve for a variable displacement type hydraulic rotary machine according to claim 10, wherein a pipe joint which constitutes a part of said command pressure conduit is provided in said external command pressure port of said valve housing, and said throttle is provided in said pipe joint.

12. A volume control valve for a variable displacement type hydraulic rotary machine according to claim 7, wherein an external command pressure chamber communicating with said external command pressure port is defined between said command pressure receiving portion and said valve housing, a throttle for generating a damper action in said external command pressure chamber is provided in a command pressure conduit which connects the external command pressure port to an external command pressure supply means, and a seal member for sealing the external command pressure chamber in a liquid-tight manner with respect to said pilot port is disposed between said valve housing and said spool.

13. A volume control valve for a variable displacement type hydraulic rotary machine according to claim 7, wherein said oil passage selectively establishes and blocks communication of said oil chamber with said pilot port and said tank port in accordance with a slide position of said spool, and the spool receives the pilot pressure at a large pressure receiving area on both said first and second pressure receiving portion sides when the oil chamber communicates with the pilot port through the oil passage, while when the oil chamber communicates with the tank port through the oil passage, the spool receives the pilot pressure at a small pressure receiving area on the first pressure receiving portion side.

14. A volume control valve for a variable displacement type hydraulic rotary machine according to claim 13, wherein said oil passage is formed so that when said oil chamber is communicated with said pilot port, the oil chamber is brought out of communication with the other ports almost simultaneously, while when the oil chamber is communicated with the other ports, the oil chamber is brought out of communication with the pilot port almost simultaneously.

15. A volume control valve for a variable displacement type hydraulic rotary machine according to claim 7, wherein said second pressure receiving portion has a pressure receiving area smaller than that of said first pressure receiving portion, and when said oil chamber communicates with said pilot port, the second pressure receiving portion receives the pilot pressure in a direction reverse to the first pressure receiving portion.

16. A volume control valve for a variable displacement type hydraulic rotary machine according to claim 15, wherein said first pressure receiving portion is formed in said spool as a bottomed bore extending in the axial direction of the spool, said bottomed hole having a diameter larger than the diameter of said axial bore and being open to an end face of the spool on the side opposite to the axial bore, and a piston member larger in diameter than said piston is inserted slidably into said bottomed bore to define a pilot pressure receiving chamber which is constantly in communication with said pilot port.

17. A volume control valve for a variable displacement type hydraulic rotary machine according to claim 16, wherein said oil passage selectively establishes and blocks communication of said oil chamber with said pilot port and said external command pressure port in accordance with a slide position of said spool, and said second pressure receiving portion receives the pilot pressure or the external command pressure in a direction reverse to said first pressure receiving portion.

18. A volume control valve for a variable displacement type hydraulic rotary machine according to claim 7, wherein said spool is constituted by a stepped spool whose one end side is larger in diameter than the other portion thereof, and said first pressure receiving portion is formed by a stepped outer periphery portion of the spool which is positioned on the larger-diameter side of the spool.

19. A volume control valve for a variable displacement type hydraulic rotary machine according to claim 7, wherein said spool has a plurality of lands for blocking communication between the ports different in pressure, and said oil passage has a throttle passage at a position where said oil chamber is brought into and out of communication with a port lower in pressure than the pilot port out of said ports.

* * * * *